(12) United States Patent
Sawal et al.

(10) Patent No.: US 11,868,442 B2
(45) Date of Patent: Jan. 9, 2024

(54) BOARD DAMAGE CLASSIFICATION SYSTEM

(71) Applicant: Dell Products L.P., Round Rock, TX (US)

(72) Inventors: Vinay Sawal, Fremont, CA (US); Ravi Shankar Sabapathy, Chengalpattu (IN); Sithiqu Shahul Hameed, Chennai (IN)

(73) Assignee: Dell Products L.P., Round Rock, TX (US)

(*) Notice: Subject to any disclaimer, the term of this patent is extended or adjusted under 35 U.S.C. 154(b) by 401 days.

(21) Appl. No.: 17/341,680

(22) Filed: Jun. 8, 2021

(65) Prior Publication Data

US 2022/0391628 A1 Dec. 8, 2022

(51) Int. Cl.

| | |
|---|---|
| G06F 18/2413 | (2023.01) |
| G06N 3/04 | (2023.01) |
| G06N 3/08 | (2023.01) |
| G06T 7/00 | (2017.01) |
| G06V 10/426 | (2022.01) |
| G06F 18/214 | (2023.01) |
| G06F 18/25 | (2023.01) |

(52) U.S. Cl.
CPC ........ *G06F 18/2413* (2023.01); *G06F 18/214* (2023.01); *G06F 18/254* (2023.01); *G06N 3/04* (2013.01); *G06N 3/08* (2013.01); *G06T 7/0002* (2013.01); *G06V 10/426* (2022.01); *G06T 2207/20072* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2022/0207686 A1* | 6/2022 | Wong | G06T 7/001 |
| 2022/0301134 A1* | 9/2022 | Stellari | G01N 21/956 |

\* cited by examiner

*Primary Examiner* — Leon Flores
(74) *Attorney, Agent, or Firm* — Joseph Mencher

(57) ABSTRACT

A board damage classification system includes a Convolutional Neural Network (CNN) sub-engine and a Graph Convolutional Network (GCN) sub-engine that were trained based on digital images of structures that have experienced natural disasters. The CNN sub-engine receives a board digital image of a board, analyzes the board digital image to identify board features, and determines a board feature damage classification for the board features. The CGN sub-engine receives a board feature graph that was generated using the board digital image and that includes nodes that correspond to the board features in the board digital image, and defines relationships between the nodes included in the board feature graph. The board feature damage classification determined by the CNN sub-engine and the relationships defined by the GCN sub-engine are then used to generate a board damage classification that includes a damage probability for board features in the board digital image.

20 Claims, 26 Drawing Sheets

602

604

BOARD DAMAGE CLASSIFICATION SYSTEM

BACKGROUND

The present disclosure relates generally to information handling systems, and more particularly to classifying damaged boards utilized with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, storage systems, networking devices, desktop computing devices, laptop/notebook computing devices, tablet computing devices, mobile phones, and many other computing devices known in the art, utilize boards (e.g., motherboards and/or other circuit boards) to support and connect components in the computing device (e.g., via traces on the boards). In some situations, boards in a computing device may fail or otherwise experience issues that are difficult to detect, diagnose, and/or otherwise identify. For example, boards may be damaged due to ineffective cooling in their computing device, the presence of dust in their computing device environment, an improper conformal coating providing on the board, the failure of components on the board, and/or due to a variety of reasons that would be apparent to one of skill in the art in possession of the present disclosure. Such damage can often produce electrical issues with a board may prevent operation (or prevent proper operation) of the computing device in which they're located, and while the detection, diagnosis, and/or identification of those electrical issues may be obvious when relatively large burn marks exist on the board, it becomes much more difficult when the only evidence of those electrical issues are micro-burn marks on the board.

As such, the detection, diagnosis, and/or recognition of such board damage typically requires that the computing device be returned to a computing device provider (via what is often referred to as a Return Merchandise Authorization (RMA)) so that the computing device may be manually inspected in order to identify the board damage. Furthermore, when the only evidence of the board damage is the micro-burn marks discussed above, those micro-burn marks are often difficult for even an expert to identify and may go undetected during manual inspection. As a result, the computing device/board may go through multiple unnecessary software/hardware debugging cycles before the board damage is detected (if that board damage is detected at all). As such, conventional board damage detection/diagnosis/identification systems are inaccurate and time-consuming, and result in computing device unavailability, unnecessary trouble shooting operations, unnecessary component replacement, and/or other deficiencies that would be apparent to one of skill in the art.

Accordingly, it would be desirable to provide a board damage classification system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a board damage classification engine that includes: a Convolutional Neural Network (CNN) sub-engine that is configured to: receive a board digital image of a board; analyze the board digital image to identify board features; and determine a board feature damage classification for at least one of the board features identified in the board digital image; and a Graph Convolutional Network (GCN) sub-engine that is configured to: receive a board feature graph that was generated using the board digital image and that includes a plurality of nodes that correspond to the board features in the board digital image; and define at least one relationship between the plurality of nodes included in the board feature graph, wherein the board damage classification engine is configured to: utilize the board feature damage classification determined by the CNN sub-engine and the at least one relationship defined by the GCN sub-engine to generate a board damage classification that includes a damage probability for at least one of the board features in the board digital image; and provide the board damage classification for display.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
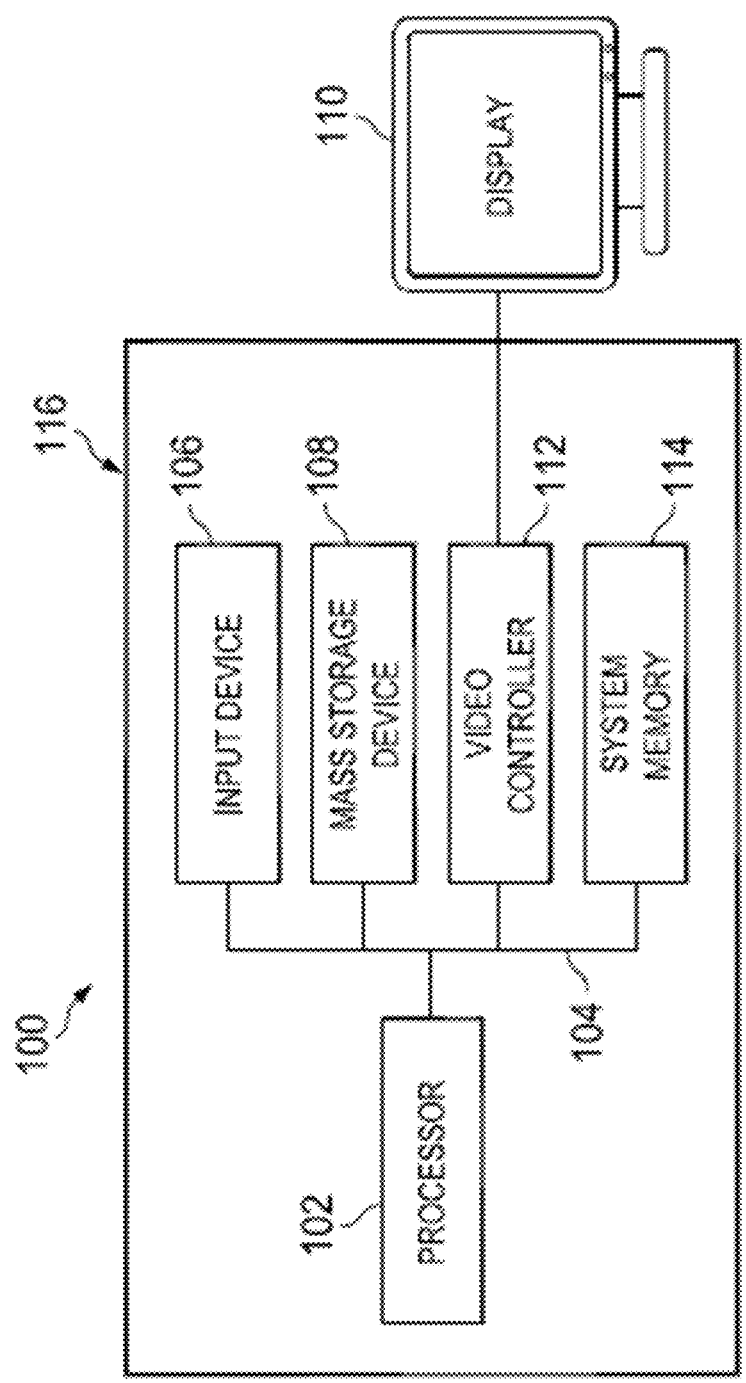
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
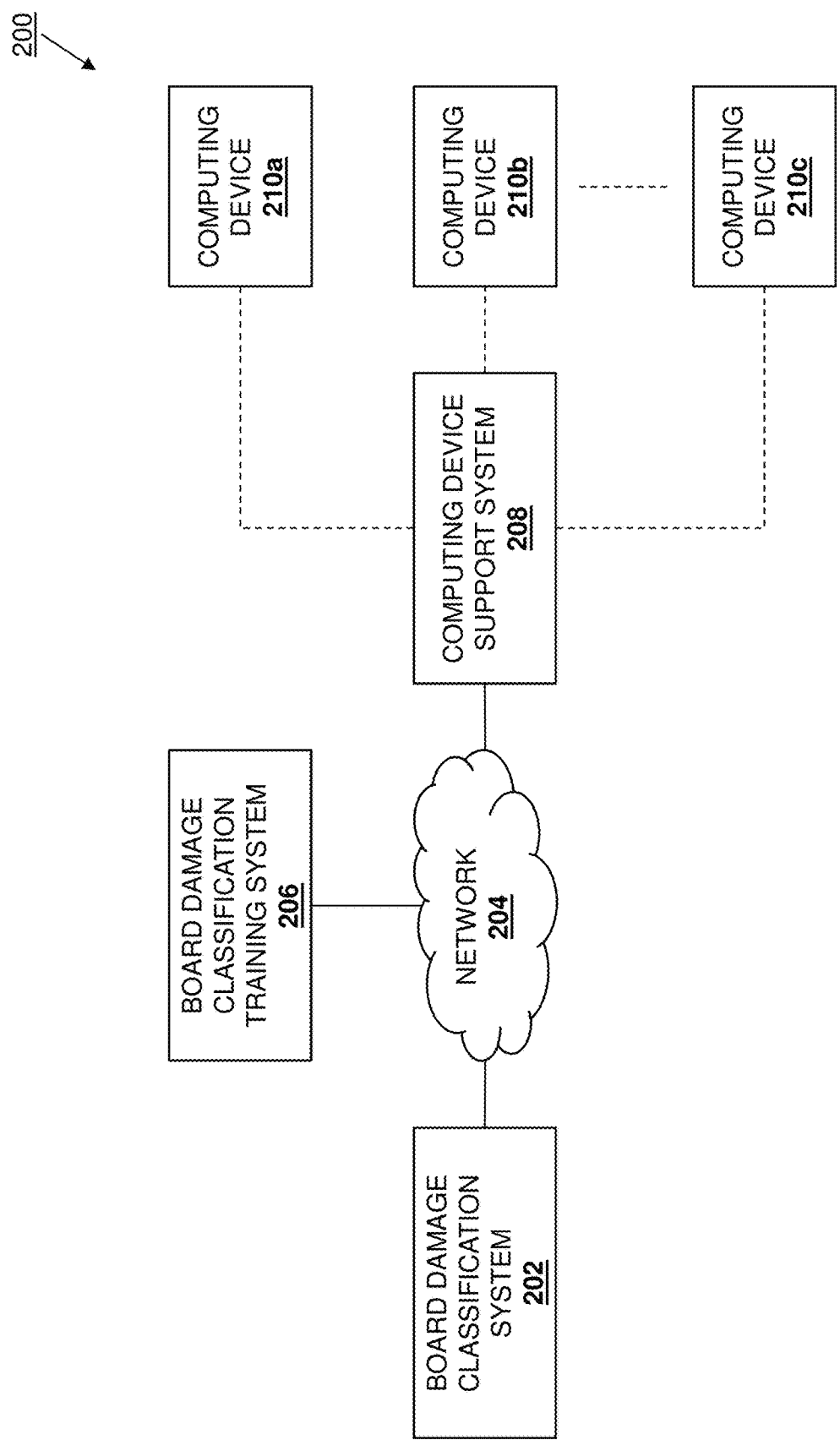
FIG. 2 is a schematic view illustrating an embodiment of a networked system that may utilize the board damage classification system of the present disclosure.

Referring now to FIG. 2, an embodiment of a networked system 200 is illustrated that may utilize the board damage classification system of the present disclosure. In the illustrated embodiment, the networked system 200 includes a board damage classification system 202. In an embodiment, the board damage classification system 202 may be provided by the IHS 100 discussed above with reference to FIG. 1, and/or may include some or all of the components of the IHS 100, and in specific examples may be provided by one or more server devices. However, while illustrated and discussed as being provided by one or more server devices, one of skill in the art in possession of the present disclosure will recognize that board damage classification system 202 provided in the networked system 200 may include any devices that may be configured to operate similarly as the board damage classification system 202 discussed below. Furthermore, while the board damage classification system 202 is the embodiments described below operates to classify damage to board features on a board, one of skill in the art in possession of the present disclosure will appreciate how the teachings of the present disclosure may be applied to the classification of other characteristics of other features in digital images while remaining within the scope of the present disclosure as well.

In the illustrated embodiment, the board damage classification system 202 is coupled to a network 204 that may be provided by a Local Area Network (LAN), the Internet, combinations thereof, and/or any of a variety of other networks that would be apparent to one of skill in the art in possession of the present disclosure. As illustrated, a board damage classification training system 206 may be coupled to the network 204 as well. In an embodiment, the board damage classification training system 206 may be provided by the IHS 100 discussed above with reference to FIG. 1, and/or may include some or all of the components of the IHS 100, and in specific examples may be provided by one or more server devices and/or storage devices. However, while illustrated and discussed as being provided by one or more server devices and/or storage devices, one of skill in the art in possession of the present disclosure will recognize that board damage classification training system 206 provided in the networked system 200 may include any devices that may be configured to operate similarly as the board damage classification system 202 discussed below.

In the specific examples below, the board damage classification training system 206 is provided by the Defense Innovation Unit and includes the xView2 Building Damage dataset ("xView2"). As will be appreciated by one of skill in the art in possession of the present disclosure, xView2 is currently accessible at https://xview2.org and provides a publicly available dataset of high-resolution satellite digital images annotated with structure locations and damage scores before and after natural disasters, and was provided to automate the process of assessing structure damage after a natural disaster. However, while the board damage classification training system 206 is described below as including digital images of structures that have experienced natural disasters (discussed in further detail below) that are utilized in deep learning/machine learning training as a proxy for the purposes of training a deep learning/machine learning model to identify damage to board features on a board, one of skill in the art in possession of the present disclosure will appreciate that other classification training systems may include other digital image datasets that may be provided as part of deep learning/machine learning training for the purposes of identifying other characteristics in digital images while remaining within the scope of the present disclosure as well.

In the illustrated embodiment, a computing device support system 208 is coupled to the network 204. In an embodiment, the computing device support system 208 may be provided by the IHS 100 discussed above with reference to FIG. 1, and/or may include some or all of the components of the IHS 100, and in specific examples may be provided by one or more server devices. However, while illustrated and discussed as being provided by one or more server devices, one of skill in the art in possession of the present disclosure will recognize that computing device support system 208 provided in the networked system 200 may include any devices that may be configured to operate similarly as the computing device support system 208 discussed below. In some specific examples, the computing device support system 208 may be provided at a physical facility that receives computing devices that are experiencing issues for the purposes of addressing those issues. However, in other specific examples, the computing device support system 208 may provide a website that allows images of a board in a computing device that is experiencing issues to be uploaded for transmission to the board damage classification system 202. However, while a few specific examples are provided, one of skill in the art in possession of the present disclosure will appreciate that the computing device support system 208 may be provided in a variety of other manners while remaining within the scope of the present disclosure as well.

As illustrated in FIG. 2, a plurality of computing devices 210a, 210b, and up to 210c may interact with the computing device support system 208 (as illustrated by the dashed lines in FIG. 2) when any of those computing devices 210a-210c (or associated computing devices) are experiencing issues. In an embodiment, any of the computing devices 210a-210c may be provided by the IHS 100 discussed above with reference to FIG. 1 and/or may include some or all of the components of the IHS 100, and in specific examples may be provided by server devices, storage devices, networking devices (e.g., switch devices), desktop computing devices, laptop computing devices, tablet computing devices, mobile phones, and/or any other computing device that would be apparent to one of skill in the art in possession of the present disclosure.

Continuing with one of the examples above, any of the computing devices 210a-210c may be provided to a physical facility at which the computing device support system 208 is provided when that computing device is experiencing issues, and the computing device support system 208 may be used to capture and/or transmit digital images of the board in that computing device via the network 204 to the board damage classification system 202. Continuing with another of the examples above, any of the computing devices 210a-210c may capture and transmit digital images of a board in a computing device that is experiencing issues to a website provided by the computing device support system 208, which may then provide those digital images to the board damage classification system 202. However, while a specific networked configuration is illustrated and described herein, one of skill in the art in possession of the present disclosure will appreciate that the digital images of boards in computing devices may be provided to the board damage classification system 202 in a variety of manners that will fall within the scope of the present disclosure as well. Furthermore, while a specific networked system 200 has been illustrated and described, one of skill in the art in possession of the present disclosure will recognize that the board damage classification system of the present disclosure may include a variety of components and component configurations while remaining within the scope of the present disclosure as well.

Figure 3A:
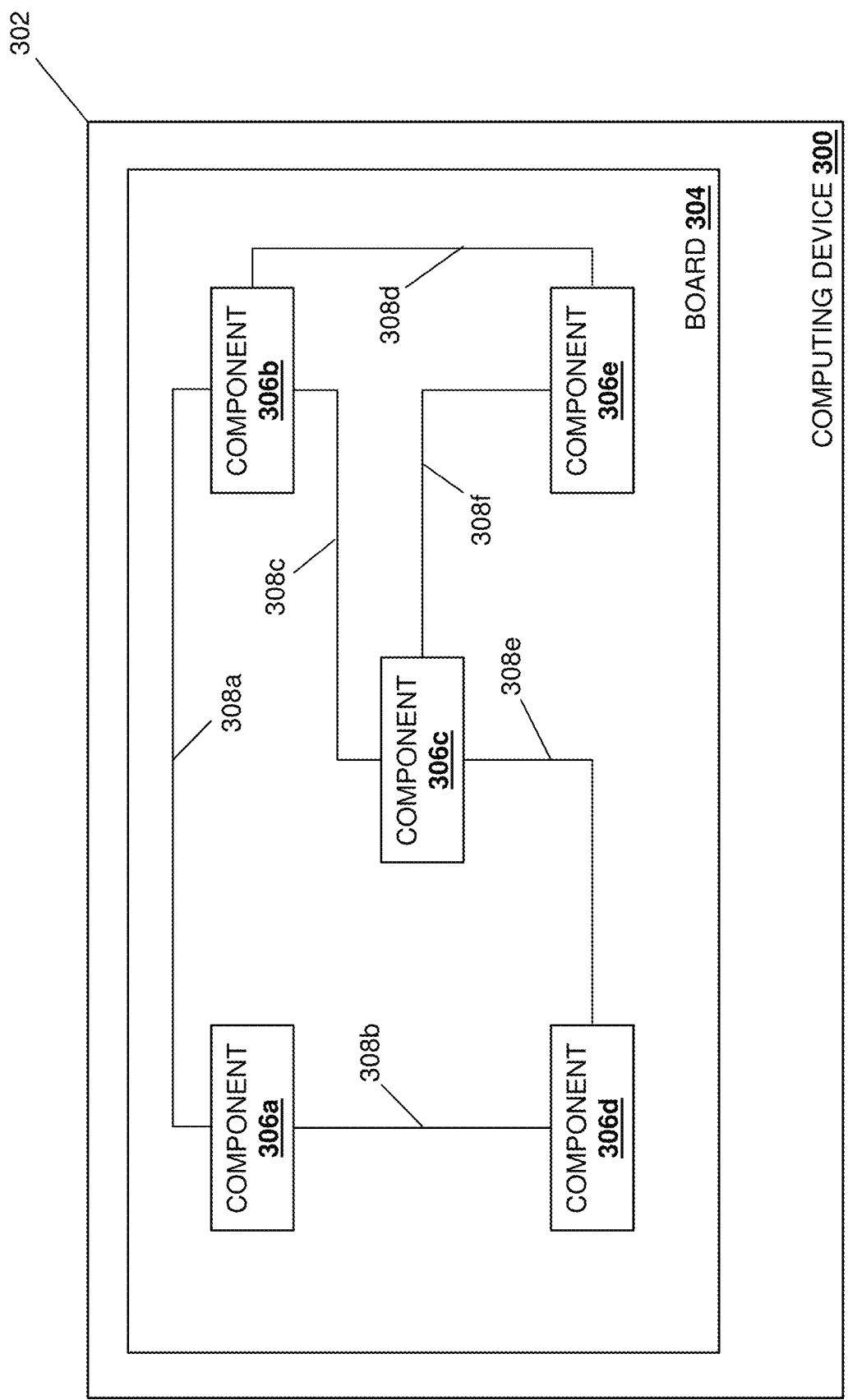
FIG. 3A is a schematic view illustrating an embodiment of a computing device that may be included in the networked system of FIG. 2.

Referring now to FIG. 3A, an embodiment of a computing device 300 is illustrated that may provide any of the computing devices 210a-210c discussed above with reference to FIG. 2, may provide a computing device that is experiencing issues that are reported by any of the computing devices 210a-210c discussed above with reference to FIG. 2, and/or may provide any computing device whose board is classified for damage according to the teachings of the present disclosure. As such, the computing device 300 may be provided by the IHS 100 discussed above with reference to FIG. 1 and/or may include some or all of the components of the IHS 100, and in specific examples may be provided by server devices, storage devices, networking devices (e.g., switch devices), desktop computing devices, laptop computing devices, tablet computing devices, mobile phones, and/or any other computing device that would be apparent to one of skill in the art in possession of the present disclosure. In the illustrated embodiment, the computing device 300 includes a chassis 302 that houses the components of the computing device 300, only some of which are illustrated below.

Figure 3B:
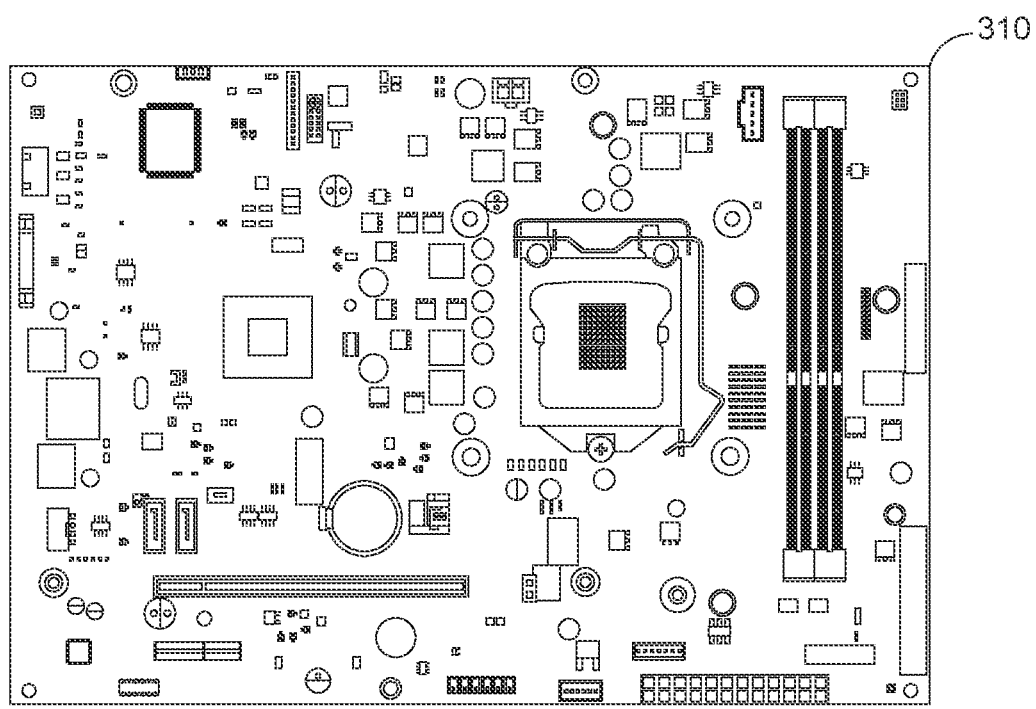
FIG. 3B is a top view illustrated an embodiment of a board that may be included in the computing device of FIG. 3A.

For example, the chassis 302 may house a board 304 (e.g., a motherboard or other circuit board that would be apparent to one of skill in the art in possession of the present disclosure) that includes a plurality of components that include components 306a, 306b, 306c, 306d, and 306d in FIG. 3A. As will be appreciated by one of skill in the art in possession of the present disclosure, the components 306a-306e may include processing systems, memory systems, storage systems, networking systems, power systems, connector systems, and/or any other board components (e.g., controllers, capacitors, inductors, Field Effect Transistors (FETs), etc.) that would be apparent to one of skill in the art in possession of the present disclosure. Furthermore, the board 304 includes a plurality of traces that couple the components 306a-306e together, with the illustrated embodiment including a trace 308a coupling the component 306a to the component 306b, a trace 308b coupling the component 306a to the component 306d, a trace 308c coupling the component 306b to the component 306c, a trace 308d coupling the component 306b to the component 306e, a trace 308e coupling the component 306c to the component 306d, and a trace 308f coupling the component 306c to the component 306e. However, while a specific computing device 300 has been illustrated, one of skill in the art in possession of the present disclosure will recognize that the board 304 in the computing device 300 illustrated in FIG. 3A is a very simplified example of a circuit board, and the board, board components, and/or board component configurations for the board 304 may be much more complicated than illustrated in FIG. 3A while remaining within the scope of the present disclosure. For example, FIG. 3B illustrates a specific circuit board that may be provided in any of the computing devices 210a-210c/300, that includes a variety of specific board components know in the art, and that may have any damage classified using the teachings of the present disclosure.

Figure 4:
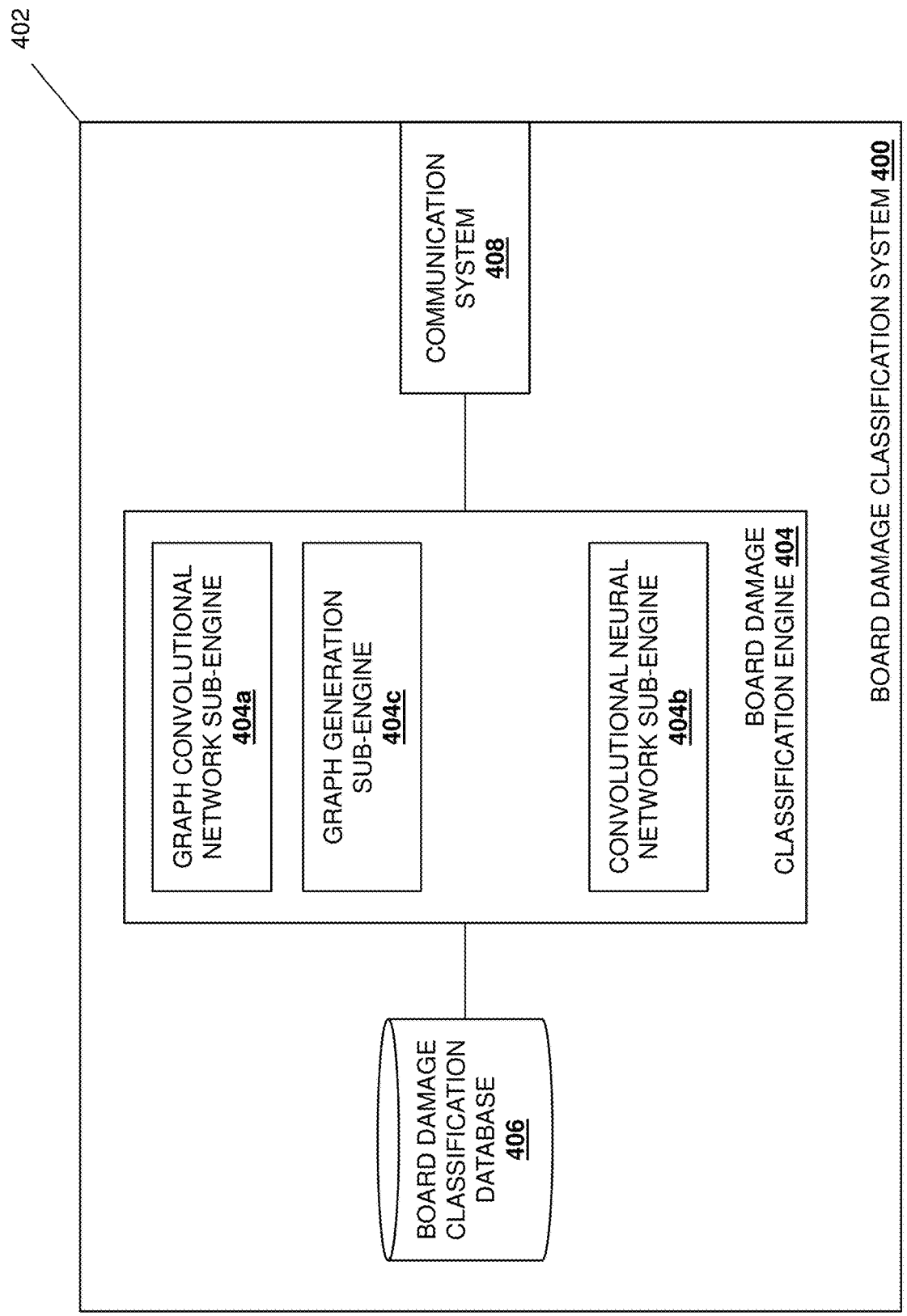
FIG. 4 is a schematic view illustrating an embodiment of a board damage classification system that may be included in the networked system of FIG. 2.

Referring now to FIG. 4, an embodiment of a board damage classification system 400 is illustrated that may provide the board damage classification system 202 discussed above with reference to FIG. 2. As such, the board damage classification system 400 may be provided by the IHS 100 discussed above with reference to FIG. 1 and/or may include some or all of the components of the IHS 100, and in specific examples may be provided by one of more server devices. Furthermore, while illustrated and discussed as being provided by one or more server devices, one of skill in the art in possession of the present disclosure will recognize that the functionality of the board damage classification system 400 discussed below may be provided by other devices that are configured to operate similarly as the board damage classification system 400 discussed below. In the illustrated embodiment, the board damage classification system 400 includes a chassis 402 that houses the components of the board damage classification system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a board damage classification engine 404 that is configured to perform the functionality of the board classification engines and/or board classification systems discussed below.

In the examples described herein, the board damage classification engine 404 provides a hybrid Graphical Convolutional Network (GCN)/Convolutional Neural Network (CNN) engine, with the memory system including instructions that, when executed by the processing system, cause the processing system to provide a GCN sub-engine 404a that is configured to perform the functionality of the GCN sub-engines and/or board classification systems discussed below, and with the memory system also including instructions that, when executed by the processing system, cause the processing system to provide a CCN sub-engine 404b that is configured to perform the functionality of the CCN sub-engines and/or board classification systems discussed below. As will be appreciated by one of skill in the art in possession of the present disclosure, conventional CNN techniques utilize a relatively deep/large number of hidden layers (e.g., 150+ hidden layers) that take a relatively long time to train and suffer from relatively high variance/overfitting. As discussed below, the hybrid GCN/CNN techniques described herein require far fewer hidden layers and greatly reduce training time and the occurrence of variance/over-fitting relative to such conventional CCN techniques.

Furthermore, in the illustrated embodiment, the memory system also includes instructions that, when executed by the processing system, cause the processing system to provide a graph generation sub-engine 404c that is included in the board damage classification engine and that is configured to perform the functionality of the graph generation sub-engines and/or board classification systems discussed below. However, while a specific multi-sub-engine board damage classification engine 404 is illustrated and described herein, one of skill in the art in possession of the present disclosure will appreciate how the functionality of the board damage classification system 400 may be provided in a variety of manners that will fall within the scope of the present disclosure as well.

The chassis 342 may also house a storage system (not illustrated, but which may include the storage 108 discussed above with reference to FIG. 1) that is coupled to the board damage classification engine 404 (e.g., via a coupling between the storage system and the processing system) and that includes a board damage classification database 406 that is configured to store any of the information utilized by the board damage classification engine 404 discussed below. The chassis 402 may also house a communication system 408 that is coupled to the board damage classification engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific board damage classification system 400 has been illustrated and described, one of skill in the art in possession of the present disclosure will recognize that board damage classification systems (or other devices operating according to the teachings of the present disclosure in a manner similar to that described below for the board damage classification system 400) may include a variety of components and/or component configurations for providing conventional server device functionality, as well as the functionality discussed below, while remaining within the scope of the present disclosure as well.

Figure 5A:
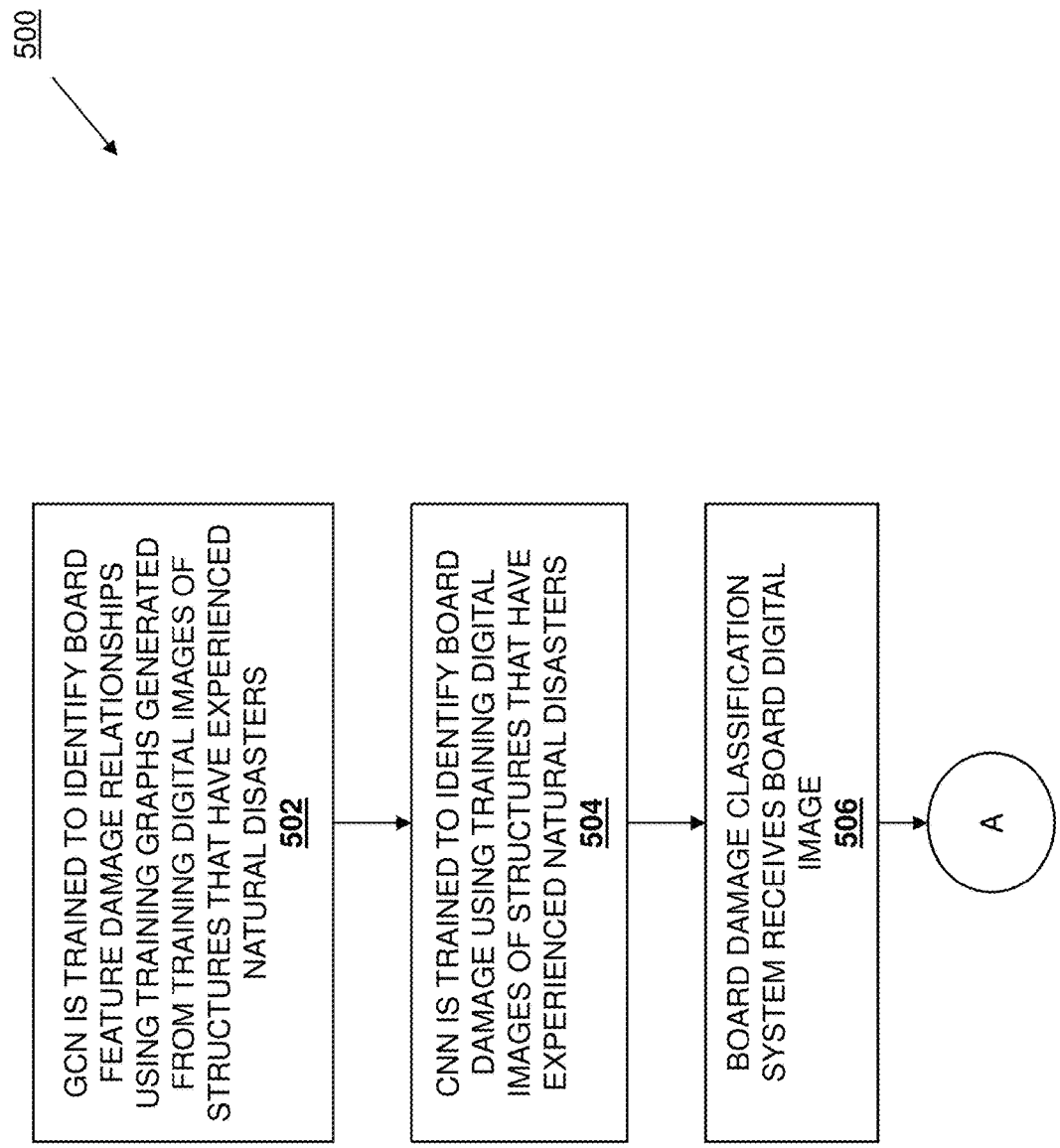
FIG. 5A is a flow chart illustrating an embodiment of a portion of a method for classifying board damage.
Figure 5B:
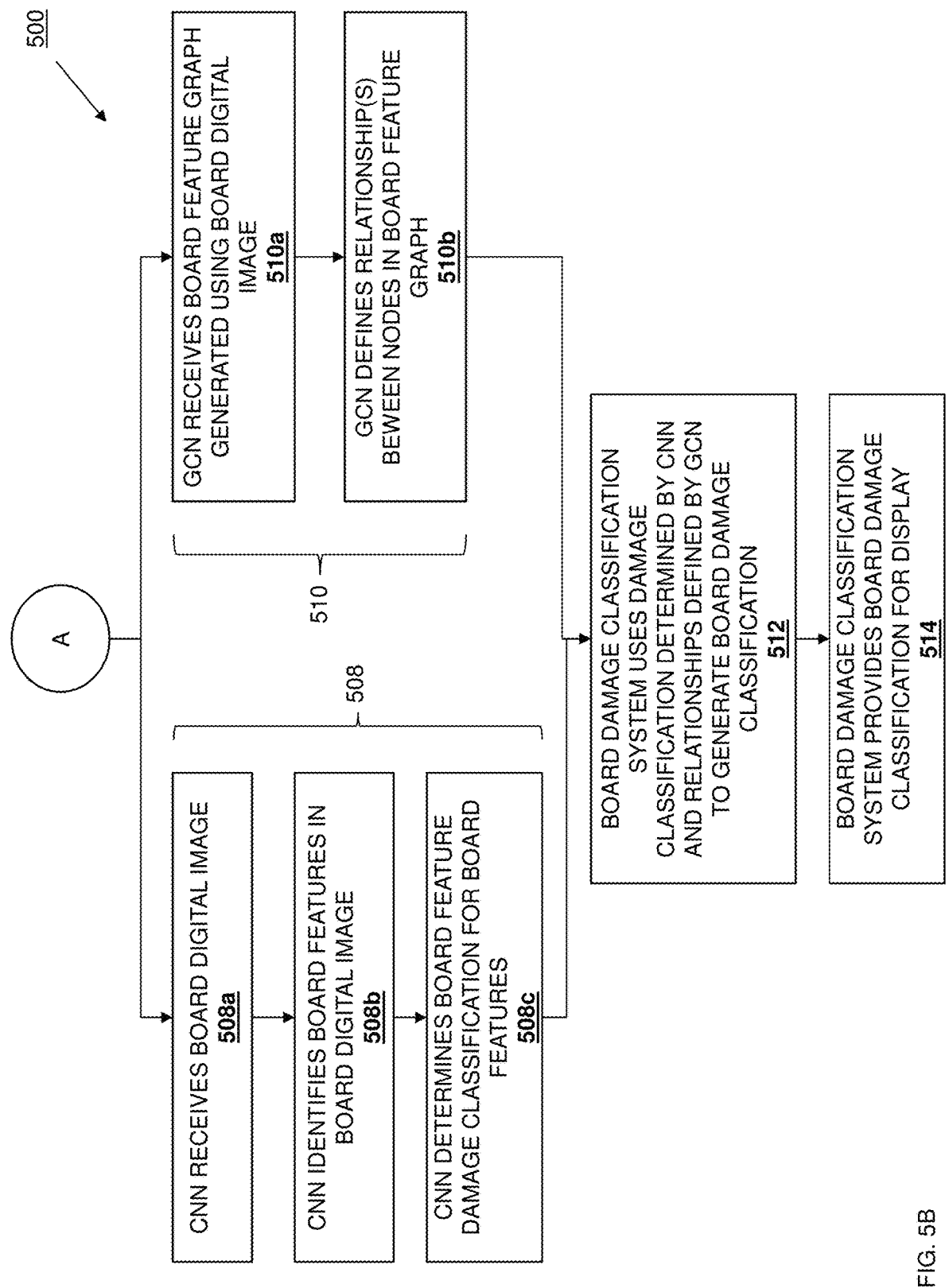
FIG. 5B is a flow chart illustrating an embodiment of a portion of the method of FIG. 5A for classifying board damage.

Referring now to FIGS. 5A and 5B, an embodiment of a method 500 for classifying board damage is illustrated. As discussed below, the systems and methods of the present disclosure provide a hybrid Graph Convolutional Network (GCN)/Convolutional Neural Network (CNN) learning system that may be trained to classify damage to a circuit board based on digital images of structures that have experienced natural disasters, and then may utilize that training to analyze circuit board digital images of circuit boards that are experiencing issues in order to output 1) a board feature damage classification that is generated using damage classifications for board features identified in the board digital image and 2) relationships between the plurality of board feature nodes included in a board feature graph generated from that board digital image, with the board feature damage classification and relationships then utilized to generate a board damage classification that includes a damage probability for the board features in the board digital image. For example, the board damage classification system includes a CNN sub-engine and a GCN sub-engine that were trained based on digital images of structures that have experienced natural disasters. The CNN sub-engine receives a board digital image of a board, analyzes the board digital image to identify board features, and determines a board feature damage classification for the board features. The CGN sub-engine receives a board feature graph that was generated using the board digital image and that includes nodes that correspond to the board features in the board digital image, and defines relationships between the nodes included in the board feature graph. The board feature damage classification determined by the CNN sub-engine and the relationships defined by the GCN sub-engine are then used to generate a board damage classification that includes a damage probability for board features in the board digital image. As such, embodiments of the systems and methods of the present disclosure provide a hybrid GCN/CNN deep learning system that may be trained using an existing structural damage dataset to identify damage to circuit boards in a manner that is faster and more accurate than conventional board damage classification systems.

Figure 6A:
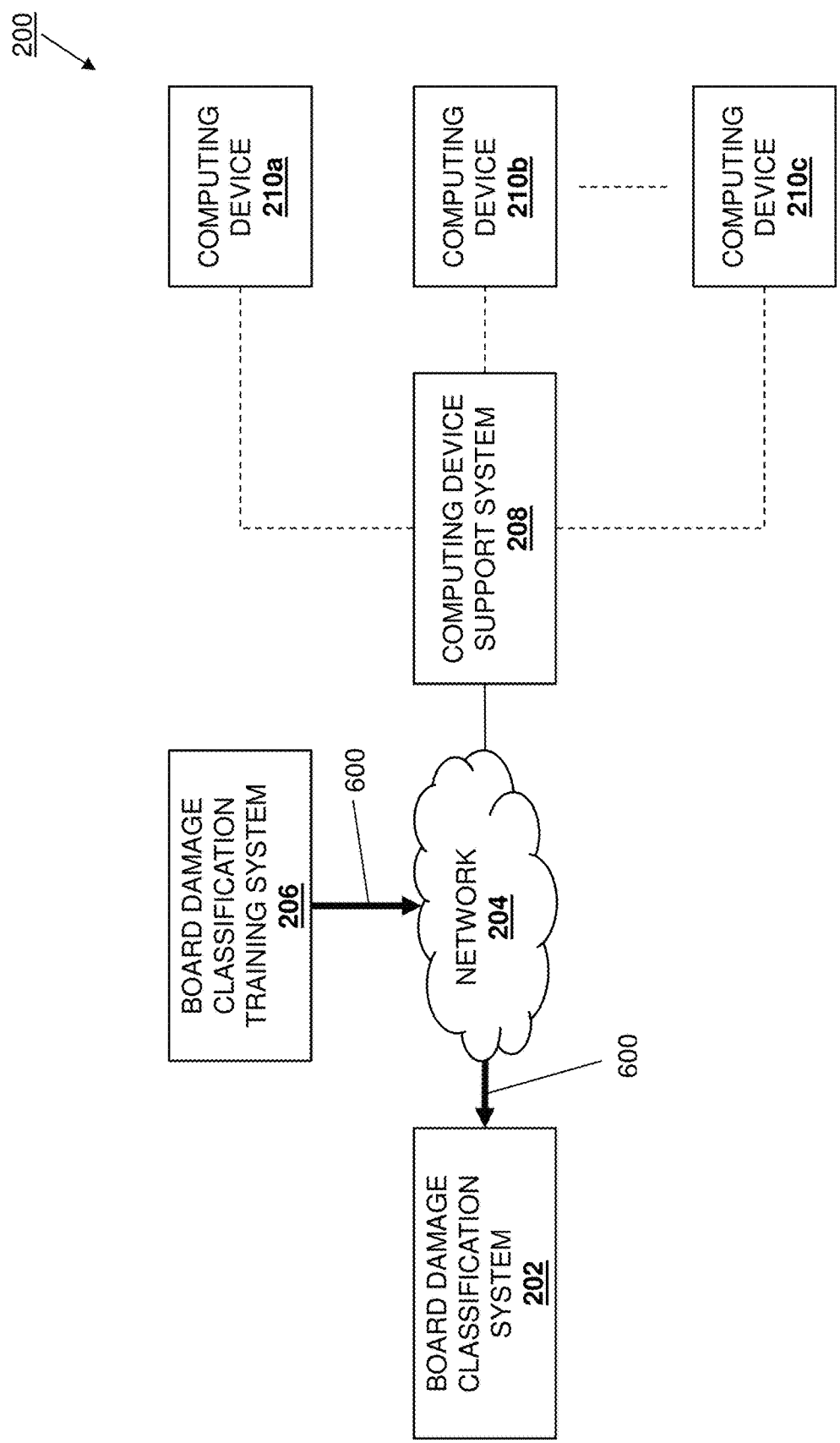
FIG. 6A is a schematic view illustrating an embodiment of the networked system of FIG. 2 operating during the method of FIG. 5.
Figure 6B:
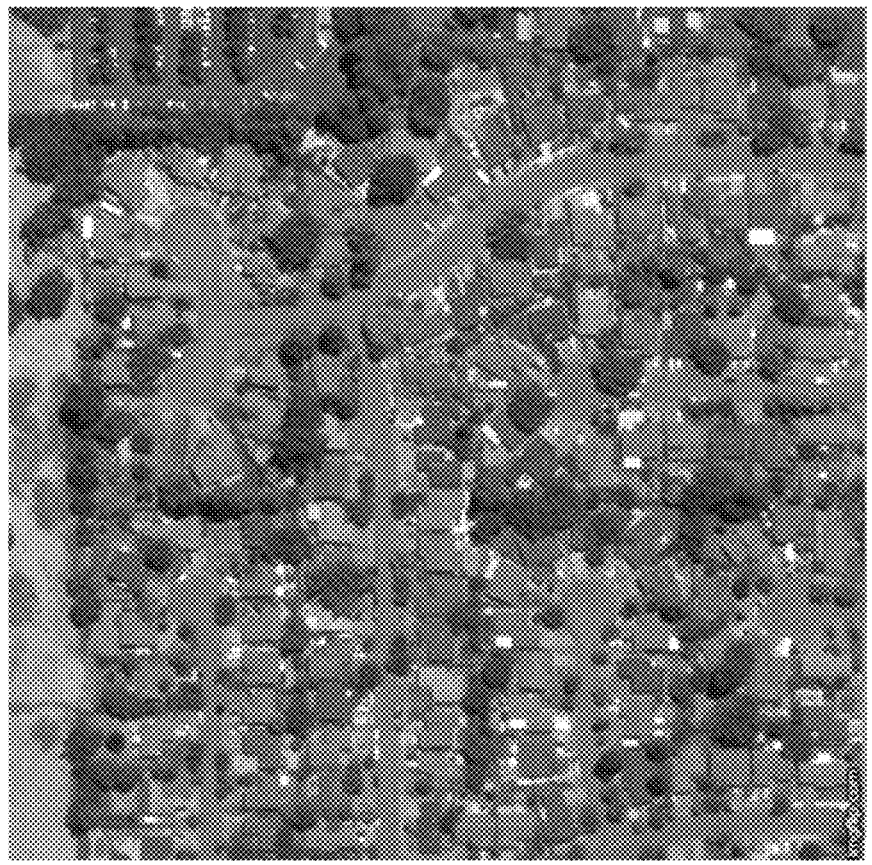
FIG. 6B is an embodiment of a "before" digital image that may be utilized during the method of FIG. 5.
Figure 6C:
FIG. 6C is an embodiment of an "after" digital image that may be utilized during the method of FIG. 5.
Figure 6D:
FIG. 6D is an embodiment of an "masked labeled" digital image that may be utilized during the method of FIG. 5.

The method 500 begins at block 502 where a Graph Convolutional Network (GCN) in a board damage classification system is trained to identify board feature damage relationships using training graphs generated from digital images of structures that have experienced natural disasters. With reference to FIG. 6A, in an embodiment of block 502, the board damage classification system 202 may perform training operations 600 that include retrieving training digital images from the board damage classification training system 600. For example, the board damage classification engine 404 may operate to access, through its communication system 408 and via the network 204, the board damage classification system 206 to retrieve training digital images via the network 204. With reference to FIGS. 6B, 6C, and 6D, the training digital images in the examples below are provided by high-resolution satellite digital images annotated with structure locations and damage scores before and after natural disasters from the xView2 database provided by the Defense Innovation Unit, discussed above. For example, the specific example in FIG. 6B illustrates a structure-before-natural-disaster digital image 602 that includes a plurality of homes in a neighborhood before a natural disaster, the specific example in FIG. 6C illustrates an example of a structure-after-natural-disaster digital image 604 that includes the plurality of homes in the neighborhood in FIG. 6B after the natural disaster, and the specific example in FIG. 6D illustrates an example of a structure-masked-labeled digital image 606 that includes masked labels for each of the plurality of homes in the neighborhood in FIG. 6C after the natural disaster that may indicate a damage classification for those homes (e.g., a home destroyed damage classification, a home major damage classification, a home minor damage classification, a home no damage classification, etc.)

As will be appreciated by one of skill in the art in possession of the present disclosure, the board damage classification training system 600 may include many training digital images (e.g., millions of image sets like those illustrated in FIGS. 6B-6D), and any of those training images may be utilized in the training discussed below. However, while particular training digital images are illustrated that includes homes in a neighborhood before and after a natural disaster along with corresponding masked labels, one of skill in the art in possession of the present disclosure will appreciate how the board damage classification training system 600 may include a variety of similar image sets of structures (i.e., before, after, masked labeled) in a variety of different configurations while remaining within the scope of the present disclosure as well.

As will be appreciated by one of skill in the art in possession of the present disclosure, a common logistical challenge encountered when building a Deep Learning (DL) model is the requirement of a relatively large data set for training of the DL model. Furthermore, one of skill in the art in possession of the present disclosure will appreciate how the hybrid GCN/CNN DL model described below for board damage classification is complicated further because it performs supervised multi-class classification techniques, and thus requires that the data set used for training the hybrid GCN/CNN DL model be labeled. As such, a DL model for board damage classification built "from scratch" would require a relatively large number of labeled image sets of circuit boards with different levels of damage (e.g., with the labels identifying the different levels of damage in each image), which would be a relatively costly and time consuming process. However, the inventors of the present disclosure have discovered that the training digital images above that were captured by a satellite and that include homes in a neighborhood (or structures in other configurations) are sufficiently similar to images of circuit boards (e.g., the circuit board 310 illustrated in FIG. 3B) to allow their use as a proxy in the board damage classification hybrid GCN/CNN DL model training discussed below, thus eliminating the cost and time needed to capture and manually label actual images of circuit boards.

Furthermore, one of skill in the art in possession of the present disclosure will appreciate that, rather than including homes in a neighborhood before and after a natural disaster, training digital images may vary depending on the classifications that are desired by the classification system of the present disclosure. As such, while the inventors have discovered that a publicly available and labeled dataset of satellite images of structures before and after natural disasters may be utilized as a proxy to train a hybrid GCN/CNN DL model for board damage classification, the inventors envision the identification of other large datasets as a proxy to train the hybrid GCN/CNN DL model of the present disclosure for performing other types of classifications while remaining with the scope of the present disclosure as well.

Figure 7A:
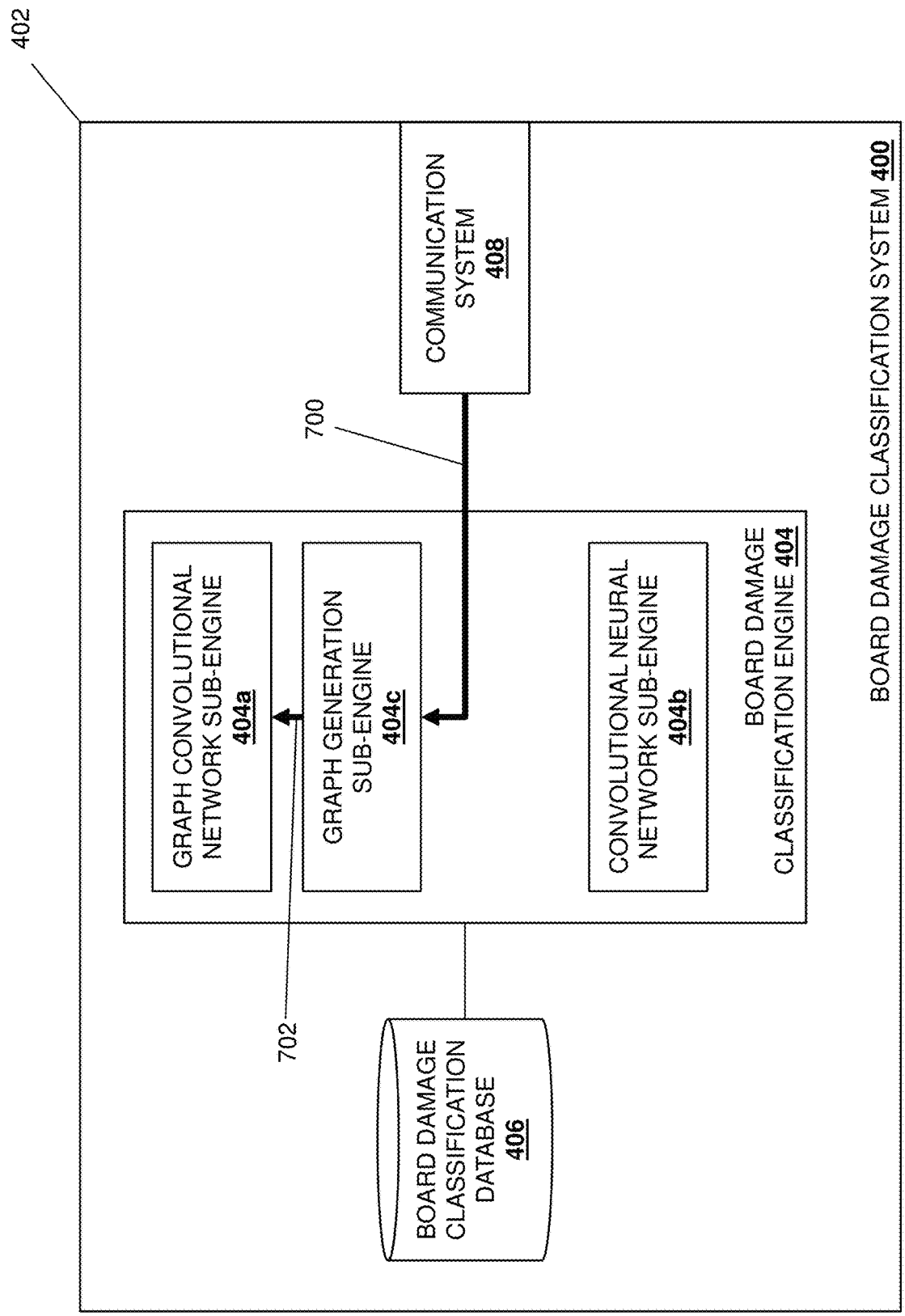
FIG. 7A is a schematic view illustrating an embodiment of the board damage classification system of FIG. 4 operating during the method of FIG. 5.

With reference to FIG. 7A, in an embodiment of block 504, the board damage classification engine 404 may perform training digital image provisioning operations 700 to provide the training digital images retrieved from the board damage classification training system 206 via its communication system 408 to the graph generation sub-engine 404c, with the graph generation sub-engine 404c performing training graph provisioning operations 702 that include generating training graphs from those training digital images and providing those training graphs to the GCN sub-engine 404a, and the GCN sub-engine 404a using those training graphs in training operations.

Figure 7B:
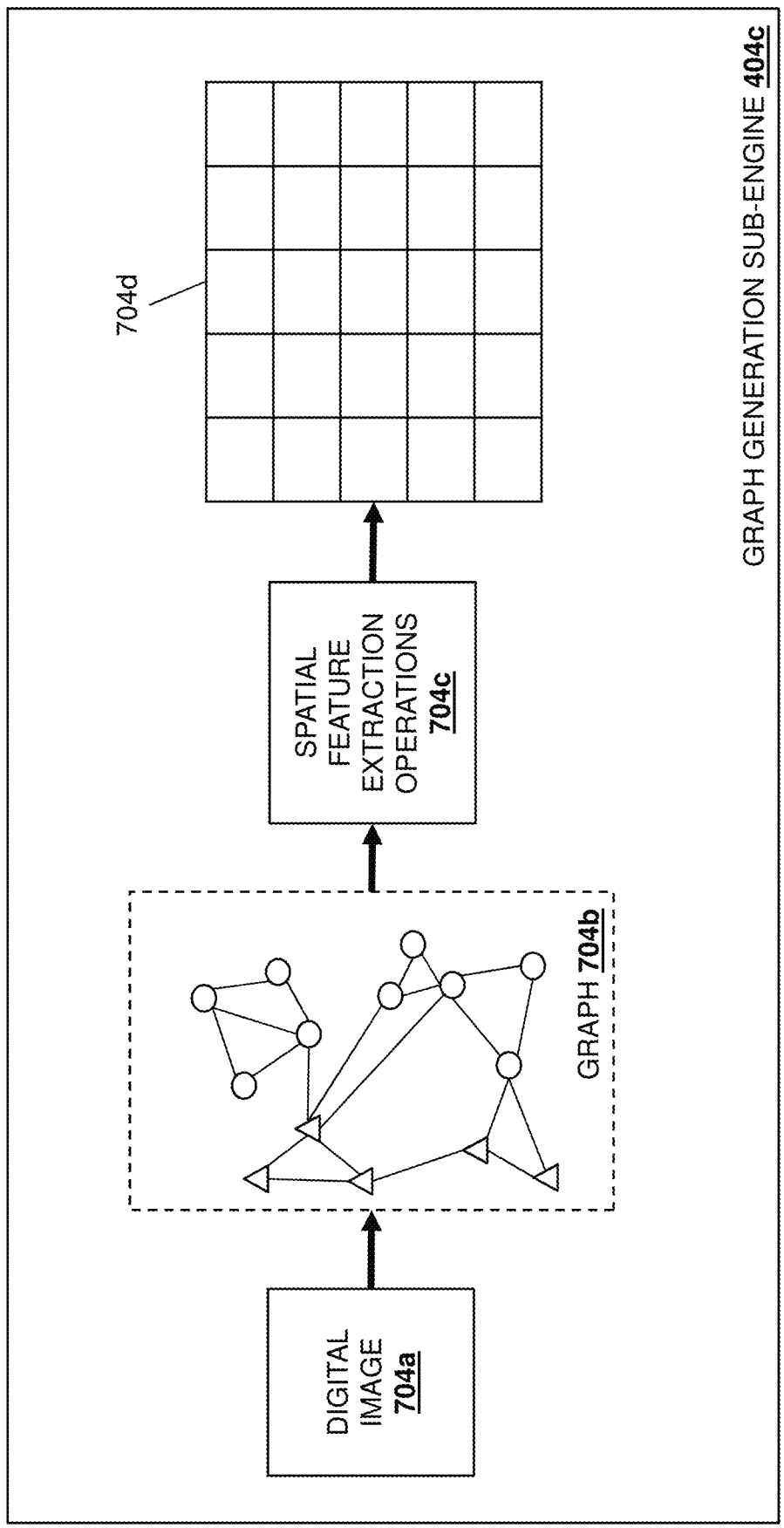
FIG. 7B is a schematic view illustrating an embodiment of a graph generation sub-engine in the board damage classification system of FIG. 4 operating during the method of FIG. 5.

In a specific example, the training digital images may provide a set of K images that may be represented as $S=\{s_1, s_2, \ldots s_k\}$, with each image having a varying number n of component sub-images $\{x_1, x_2, \ldots x_n\} \in s_i$ of varying sizes. With reference to FIG. 7B, for any particular training digital image 704a, the graph generating sub-engine 404c may generate a training graph 704b having a graph structure $G=(V, E)$ where each node $v_i \in V$ corresponds to an $x_i$ component sub-image, and each edge $e_{ij} \in E$ represents when components $v_i$ and $v_j$ are located within a predefined threshold in image $s_k$. Furthermore, each node $v_i$ may be defined by m features such that $v \in R^m$. As part of the graph generation operations, the graph generation sub-engine 404c may compute the centroid c of each node $v_i$ within each image $s_k$, and for each node pair $v_i$ and $v_j$ in image $s_k$, if Euclid($c_i$, $c_j$)<θ (where θ is a predefined threshold), then $v_i$ and $v_j$ are declared as neighbors (i.e., $e_{ij}=1$). Following the generation of the graph structure G for each training digital image 704a, a spatial feature extraction algorithm (e.g., a Recursive Feature Extraction (ReFex) algorithm) may execute spacial feature extraction operations 704c on each node to generate features for those nodes.

An adjacency matrix $\hat{A}$ ($\hat{A} \in R^{n \times m}$) may then be created to represent the graph G (e.g., an n×n matrix where n is the number of nodes in the graph G), and a degree matrix D ($D \in R^{n \times m}$) may be created to represent degrees of each node in the graph G (e.g., an n×n identity matrix). The adjacency matrix $\hat{A}$ ($\hat{A} \in R^{n \times m}$) may be normalized using the degree matrix D ($D \in R^{n \times m}$) to build a GCN normalized adjacency matrix A using the following formula:

$$A = D^{1/2} * \hat{A} * D^{-1/2}$$

For each node in the graph G, the spatial feature extraction operations 704c may create a feature vector with spatial features per node, with categorical (e.g., nominal, ordinal) features converted into numeric features using label encoders and one-hot vector encoders. All feature vectors may then be stacked to create a node/feature matrix 704d (which may be represented by X ($X \in R^{n \times d}$)) that represents all features from all of the nodes.

The node/feature matrix 704d is then provided to the GCN sub-engine 404a, which may be represented by the following equation:

$$GCN = AGG(h_u^{k-1}, u \in N(v_i))$$

In order to ensure that only activations of $v_i$ and neighbor(s) u are concatenated with a CNN feature map corresponding to $v_i$ (discussed in further detail below), an additional mask layer may be added (illustrated in FIG. 7C). For example, the mask layer may be the row of the adjacency matrix $A_{vi}$ (discussed above) pertaining to $v_i$ (which includes the node/feature matrix 704d (X in the equation below) and a non-linear activation function ReLU):

$$GCN = A_{vi} * ReLU(A * ReLU(A * XW_{k-1})W_k)$$

Figure 7C:
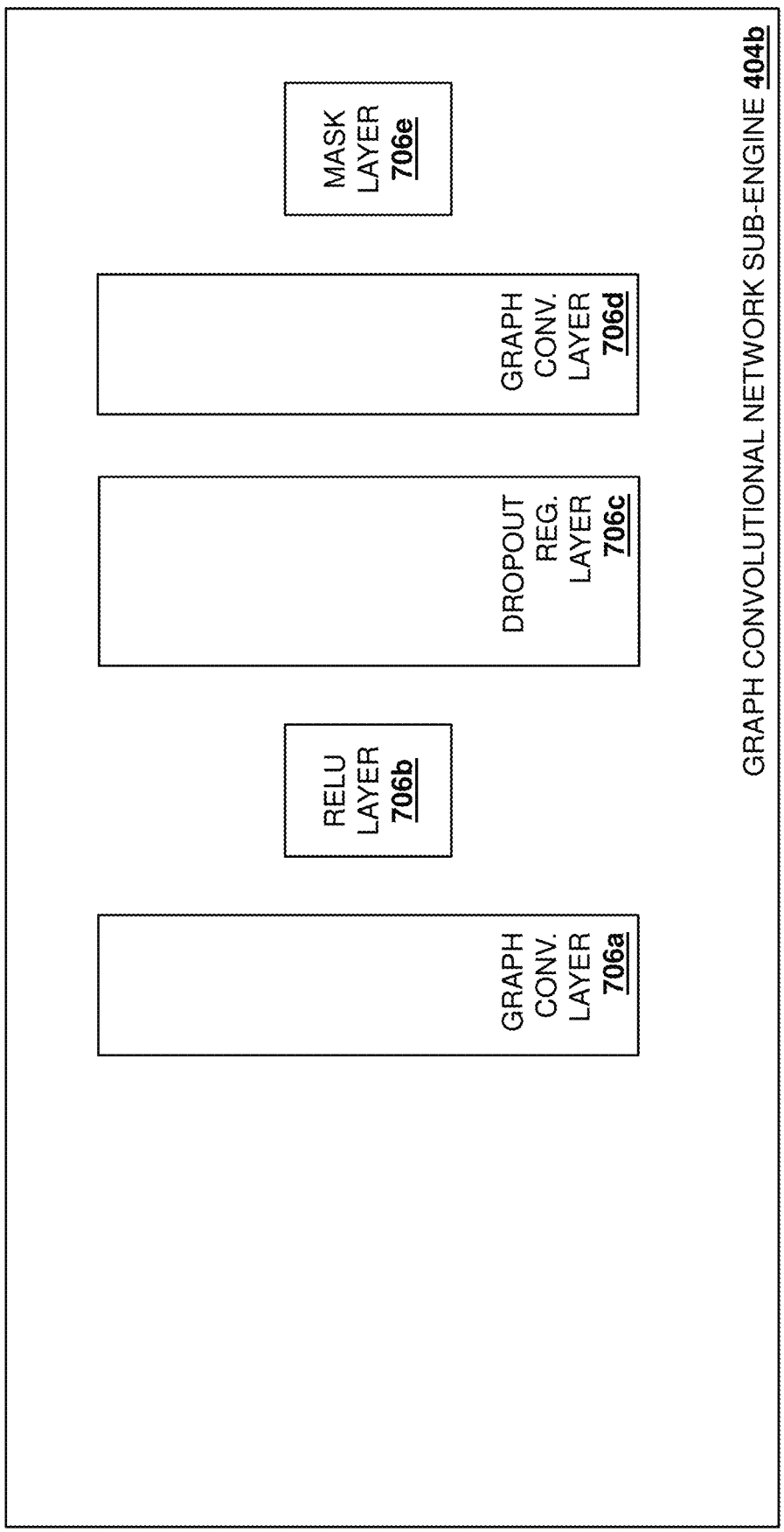
FIG. 7C is a schematic view illustrating an embodiment of a graph convolutional network sub-engine in the board damage classification system of FIG. 4 operating during the method of FIG. 5.

Thus, with reference to FIG. 7C, the training operations may result in the configuration of the GCN sub-engine 404a to provide a graph convolutional layer 706a, a non-linear activation function (e.g., ReLU) layer 706b, a dropout regularization layer 706c, another graph convolutional layer 706d, and a mask layer 706f. However, while a specific configuration of the GCN sub-engine 404a is illustrated and described in the examples below, one of skill in the art in possession of the present disclosure will appreciate how the GCN sub-engine 404a may be provided with other configurations that will enable the functionality described below while remaining within the scope of the present disclosure as well.

Figure 8A:
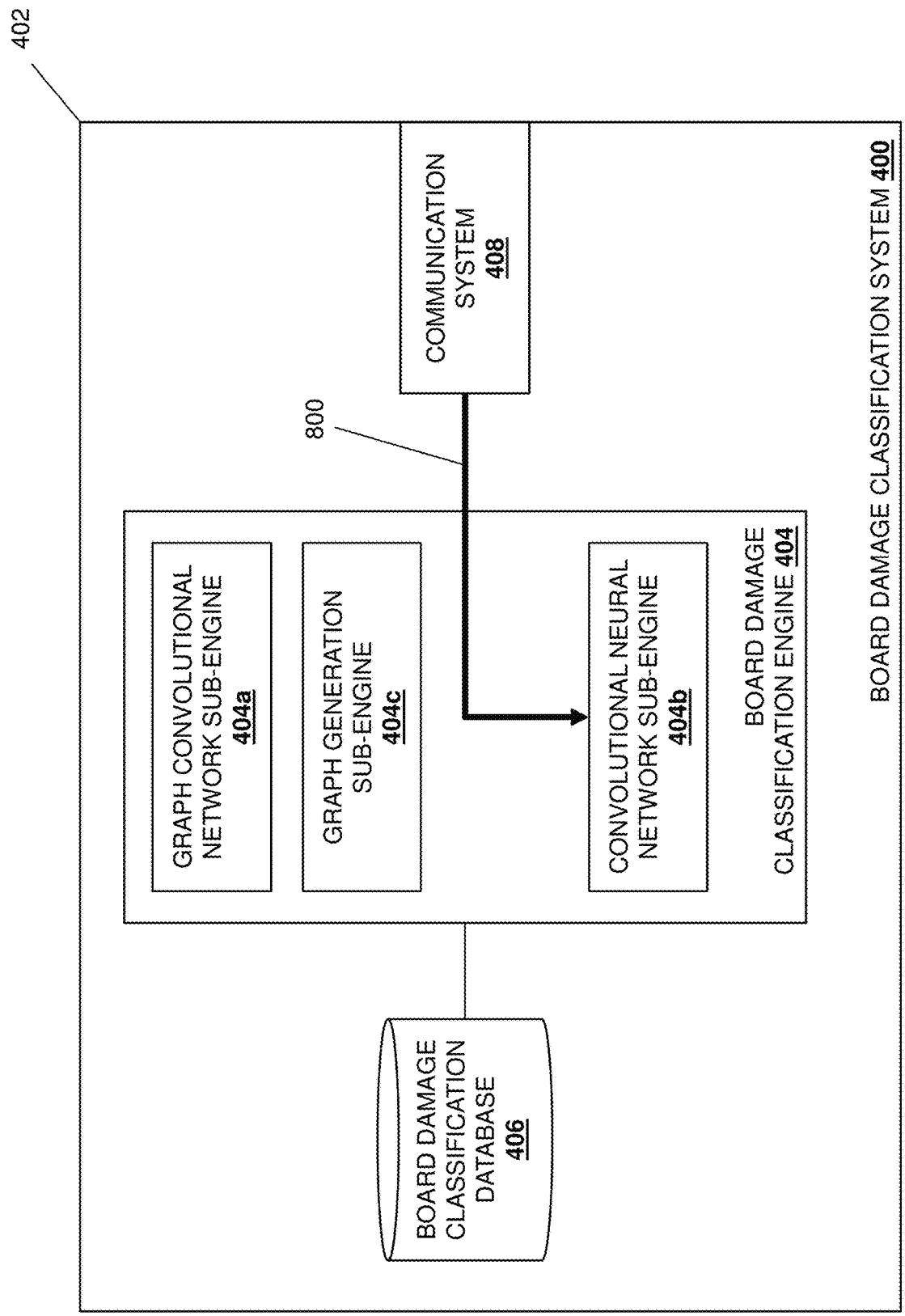
FIG. 8A is a schematic view illustrating an embodiment of the board damage classification system of FIG. 4 operating during the method of FIG. 5.

The method 500 then proceeds to block 504 where a Convolutional Neural Network (CNN) in the board damage classification system is trained to identify board damage using training digital images of structures that have experienced natural disasters. With reference to FIG. 8A, in an embodiment of block 504, the board damage classification engine 404 may perform training digital image provisioning operations 800 to provide the training digital images retrieved from the board damage classification training system 206 via its communication system 408 to the CNN sub-engine 404b, with the CNN sub-engine 404b using those training digital images in training operations.

In a specific example, the CNN sub-engine 404b may be trained (concurrently with or independently of the GCN sub-engine 404a) using pixel data from the component sub-images $x_i$ discussed above with reference to the training graph generation operations. In a specific example, the CNN sub-engine 404b may leverage transfer learning using a residual neural network (Resnet) model (e.g., a Resnet-50 model) that has been trained on an Imagenet dataset, with a lower half of the Resnet-50 model weights frozen to take advantage of low level feature maps including edges that distinguish between different objects, and an upper half of the Resnet-50 model weights trained to provide feature maps that are specific to damaged structures. In order to mitigate unbalanced data sets, data points may be weighted as an inverse of the number of samples available per class in the cost function, which one of skill in the art in possession of the present disclosure will recognize operates to provide more significance to relatively sparse classes. Furthermore, data augmentation may be performed with each data point focused on image properties inherent with the imagery data (e.g., horizontal and vertical flip, height and weight shift, etc.) In order to improve training time, batch normalization may be used on convolutional layers while dropout may be used on dense layers to mitigate "over-fitting" issues.

Figure 8B:
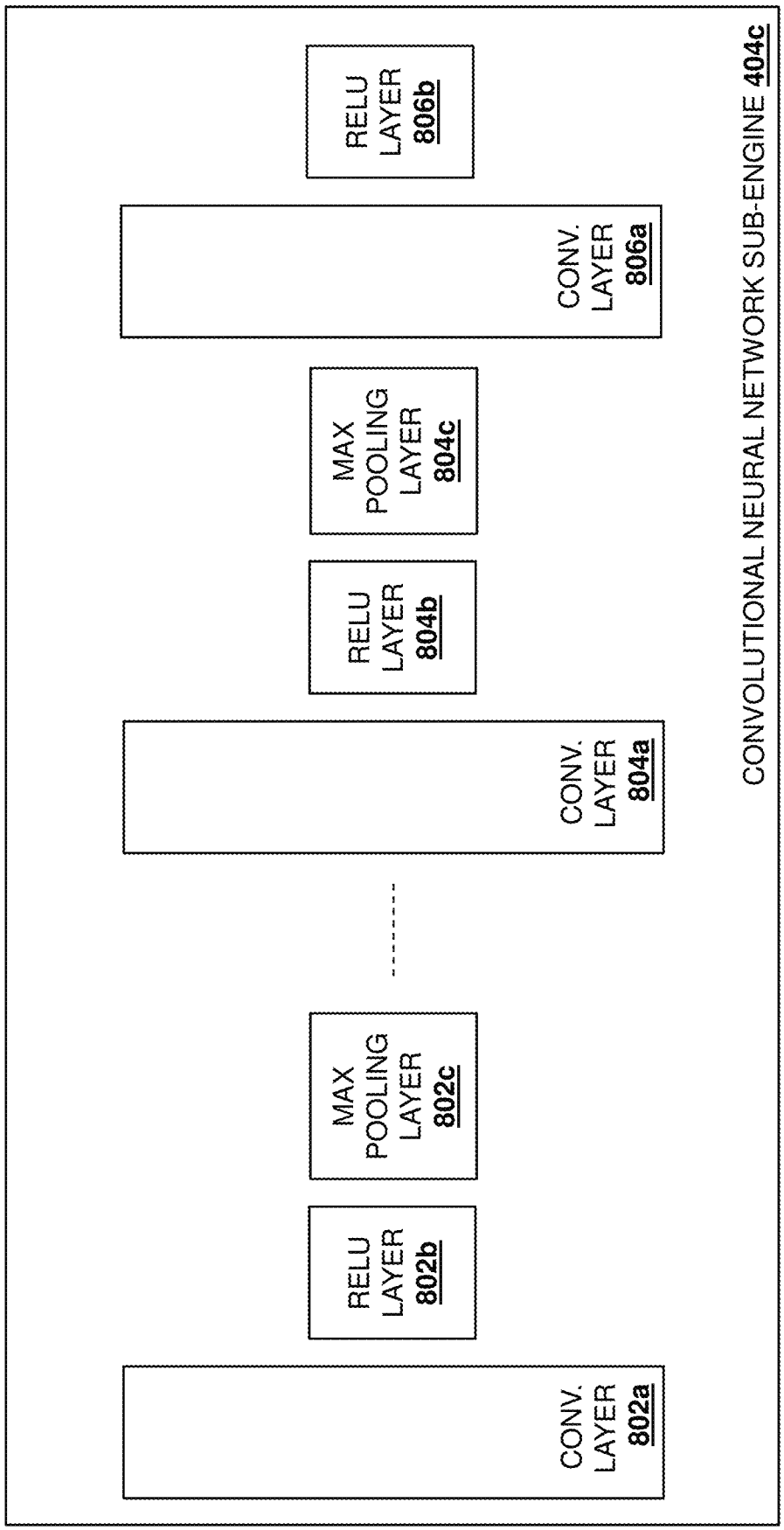
FIG. 8B is a schematic view illustrating an embodiment of a convolutional neural network sub-engine in the board damage classification system of FIG. 4 operating during the method of FIG. 5.

Thus, with reference to FIG. 8B, in a specific example the training operations may result in the configuration of the CNN sub-engine 404b to provide a convolutional layer 802a/non-linear activation function (e.g., ReLU) layer 802b/max pooling layer 802c group, and up to a convolutional layer 804a/non-linear activation function (e.g., ReLU) layer 804b/max pooling layer 804c group, along with a convolutional layer/non-linear activation function (e.g., ReLU) layer 806b group, and one of skill in the art in possession of the present disclosure will appreciate how the CNN sub-engine 404c may be configured to include as many convolutional layer/non-linear activation function (e.g., ReLU) layer/max pooling layer groups (e.g., between the convolutional layer 802a/non-linear activation function (e.g., ReLU) layer 802b/max pooling layer 802c group and the convolutional layer 804a/non-linear activation function (e.g., ReLU) layer 804b/max pooling layer 804c group) as desired and defined by the user training the CNN sub-engine 404c. However, while a specific configuration of the CNN sub-engine 404b is illustrated and described in the examples below, one of skill in the art in possession of the present disclosure will appreciate how the CNN sub-engine 404b may be provided with other configurations that will enable the functionality described below while remaining within the scope of the present disclosure as well.

Thus, the hybrid GCN/CNN DL model provided by the GCN sub-engine 404a and the CNN sub-engine 404b in the board damage classification engine 404 may be represented by:

$$y_i = f(x_i, v_i) = F(W_k * \sigma([W_{k-1} * AGG(h_u^{k-1}, \forall u \in N(v_i), C^{k-1}(x_i)])))$$

where u represents the nearest neighbors of v, AGG represents the GCN component of the model, represents the CNN component of the model, σ represents a dense layer concatenation of the GCN and CNN components, W represents trainable parameters of the model, and $y_i \in \{0,1,2,3\}$ represents the (0) no-damage classification, (1) minor damage classification, (2) major damage classification, and (3) destroyed classification utilized in the examples below.

Figure 9:
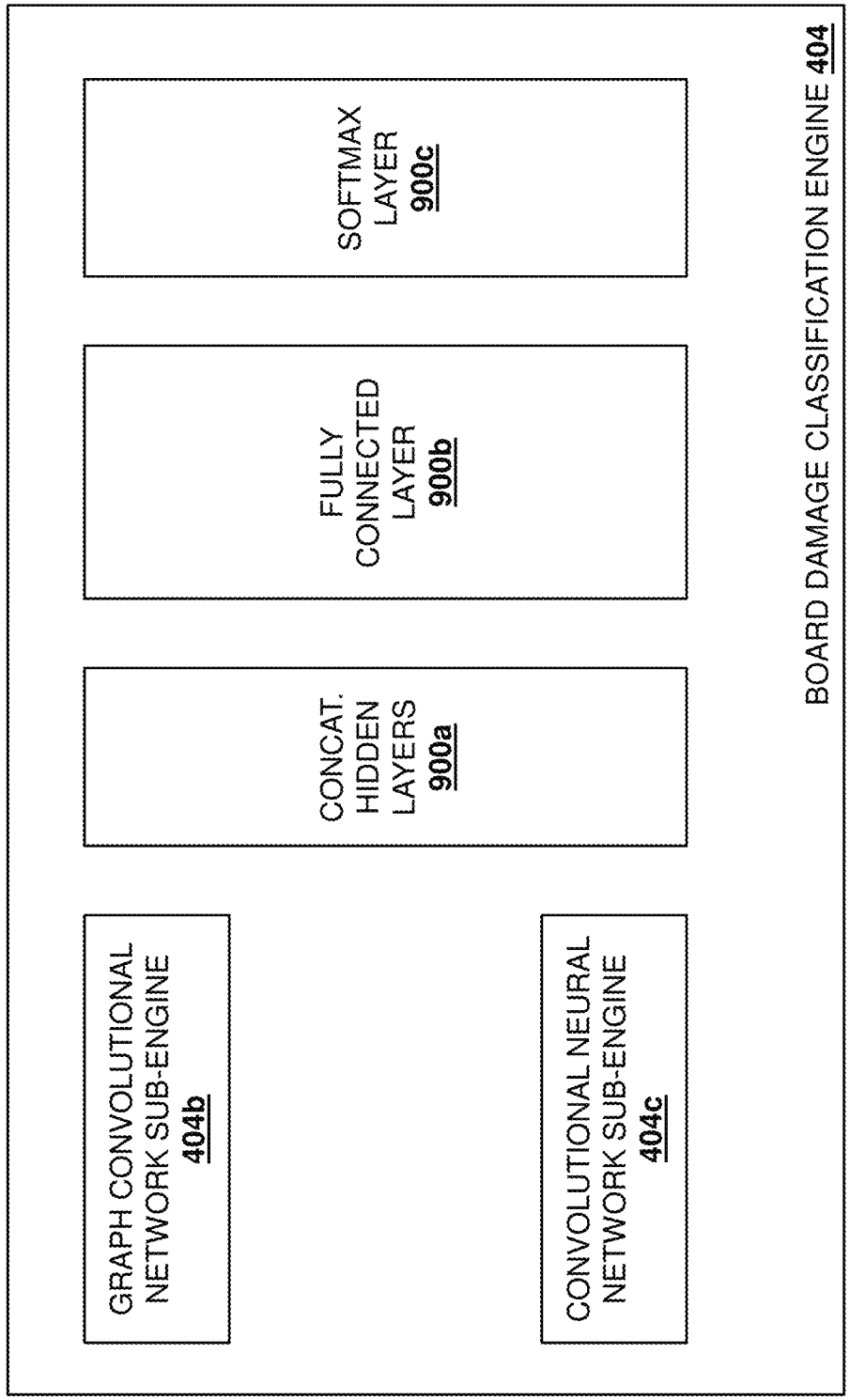
FIG. 9 is a schematic view illustrating an embodiment of a board damage classification engine in the board damage classification system of FIG. 4 operating during the method of FIG. 5.

With reference to FIG. 9, the board damage classification engine 404 may be configured with concatenated hidden layers 900a, a fully connected layer 900b, and a softmax layer 900c. As will be appreciated by one of skill in the art in possession of the present disclosure, the output of the GCN sub-engine 404a and the CNN sub-engine 404b may be concatenated by the concatenated hidden layers 900a into a dense layer provided by the fully connected layer 900b in order to allow for non-linear activation and aggregation. Furthermore, the softmax layer 900c may be utilized to provide probability distributions for each of the no-damage classification, minor damage classification, major damage classification, and destroyed classification for board features in the board digital images discussed below. While not illustrated, in some embodiments a categorical cross-entropy loss function may be minimized across different damage classifications in order to train weights utilized in the GCN sub-engine 404a and the CNN sub-engine 404b.

As such, the GCN sub-engine 404a and the CNN sub-engine 404b may be trained as discussed above to provide a hybrid GCN/CNN DL classification technique that, as described below, operates to automatically detect if there is any damage to a circuit board due to, for example, electrical issues that have resulted in visible damage (e.g., burn marks including micro-burn marks) on the board. As discussed above, the hybrid GCN/CNN DL model $y_i = f(x_i, v_i)$ includes $y_i \in \{0,1,2,3\}$ corresponding to different damage classifications for board features identified in a board digital image, and exploits the spatial properties of board feature damage and the use of latent semantic feature extraction techniques to extract features such as degree features (e.g., in-degree, out-degree, Jaccard's coefficient), edge link features (e.g., an Adamic-Adar Index, a preferential attached score), centrality measure features (e.g., in-degree, out-degree), and composite features (e.g., Strongly Connected Components (SCCs), Weakly Connected Components (WCCs)). As will be appreciated by one of skill in the art in possession of the present disclosure, the GCN sub-engine 404a may utilize the concept of convolutions on a graph by using multiple filters/kernals to aggregate local neighborhood regional information for the training digital images described above in order to extract high-level representations in a graph.

Figure 10A:
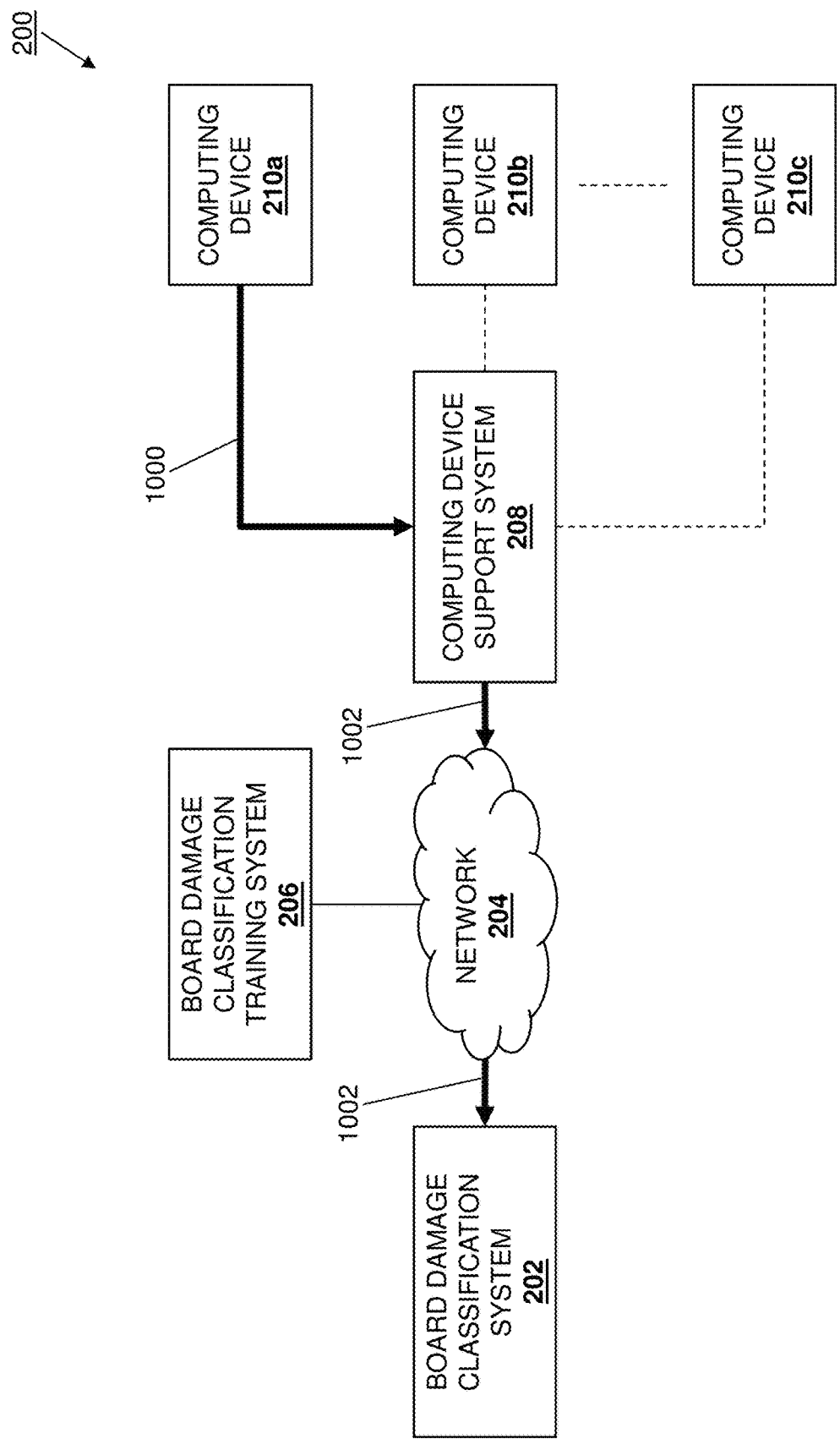
FIG. 10A is a schematic view illustrating an embodiment of the networked system of FIG. 2 operating during the method of FIG. 5.
Figure 10B:
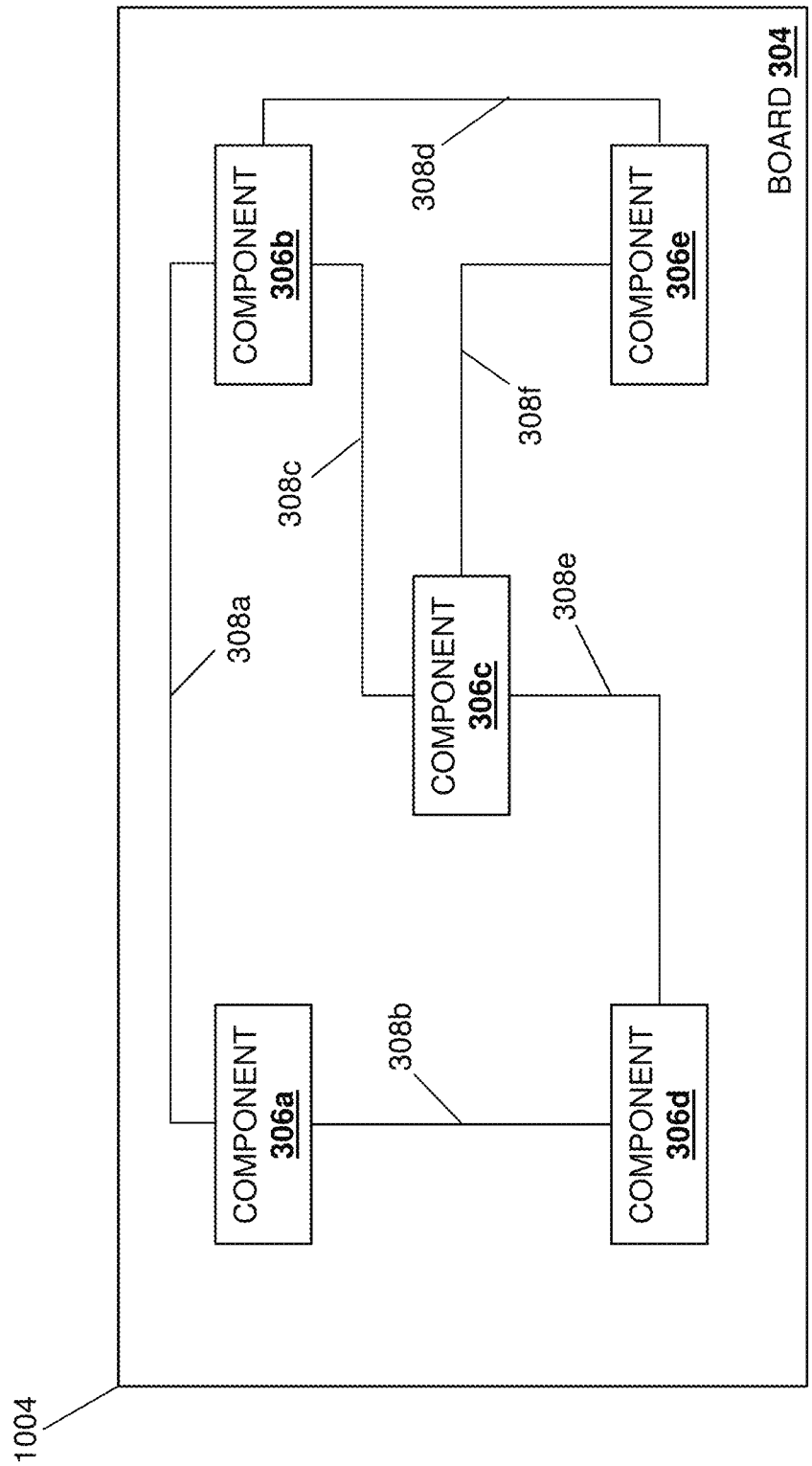
FIG. 10B is an embodiment of a digital image of a board in the computing device of FIGS. 3A and 3B that may be utilized during the method of FIG. 5.

The method 500 then proceeds to block 506 where the board damage classification system receives a board digital image. With reference to FIG. 10A, in an embodiment of block 506, the computing device 210a may be involved in interaction operations 1000 with the computing device support system 208 that result in board digital image transmission operations 1002 from the computing device support system 208 via the network 204 to the board classification system 202. For example, the computing device 210a/300 may be experiencing issues and may be physically provided as part of the interaction operations 1000 to the computing device support system 208, and the computing device support system 208 may then capture at least one board digital image of the board 304 in the computing device 210a/300 and transmit the board digital image(s) via the network 204 to the board damage classification system 202 as part of the board digital image transmission operations 1002. In another example, the computing device 210a may capture at least one board digital image of the board 304 in a computing device 300 that is experiencing issues, and may transmit the board digital image(s) to the computing device support system 208 as part of the interaction operations 1000. The computing device support system 208 may then transmit the board digital image(s) via the network 204 to the board damage classification system 202 as part of the board digital image transmission operations 1002. FIG. 10B illustrates an example of a board digital image 1004 of the board 304 in a computing device 300 that is experiencing issues, and one of skill in the art in possession of the present disclosure will appreciate how the board digital image may be substantially similar to the circuit board 310 illustrated in FIG. 3B.

Figure 10C:
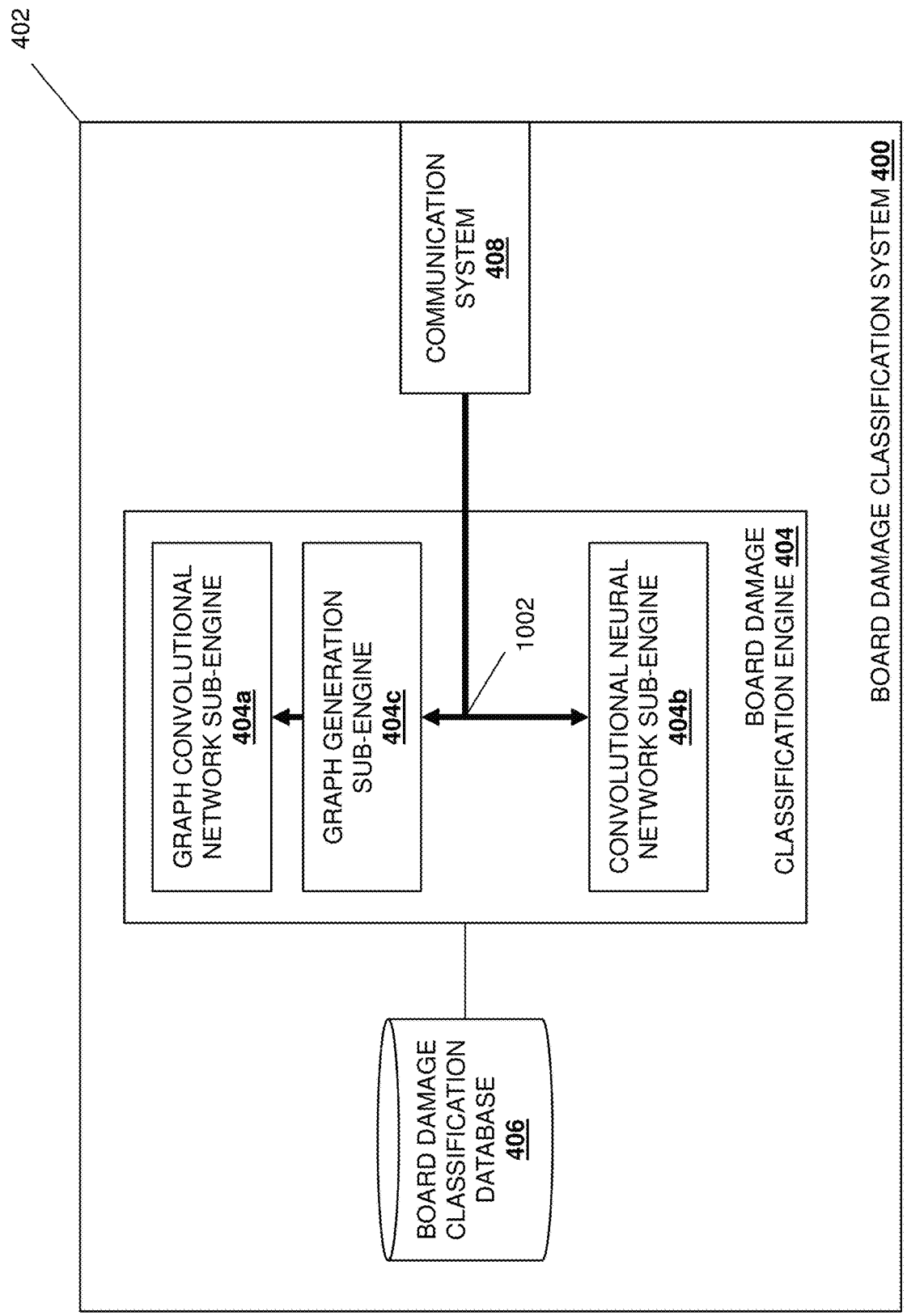
FIG. 10C is a schematic view illustrating an embodiment of the board damage classification system of FIG. 4 operating during the method of FIG. 5.

The method 500 then proceeds to block set 508 where the CNN analyzes the board digital image based on its training at block 502, and to block set 510 where the GCN analyzes the board digital image based on its training at block 504, and one of skill in the art in possession of the present disclosure will appreciate how the block sets 508 and 510 may be performed at the same time while remaining within the scope of the present disclosure. With reference to FIG. 10C, in an embodiment of block 508a, the board damage classification engine 404 may receive the board digital image(s) via its communication system as part of the board digital image transmission operations 1002, and may provide the board digital image(s) to each of the CNN sub-engine 404b and the graph generation sub-engine 404c. Furthermore, while the discussion below is limited to a single board digital image that is provided to both the CNN sub-engine 404b and the graph generation sub-engine 404c, one of skill in the art in possession of the present disclosure will appreciate that any number of board digital images of a board may be received, with each of those board digital images being provided to both the CNN sub-engine 404b and the graph generation sub-engine 404c.

Figure 11:
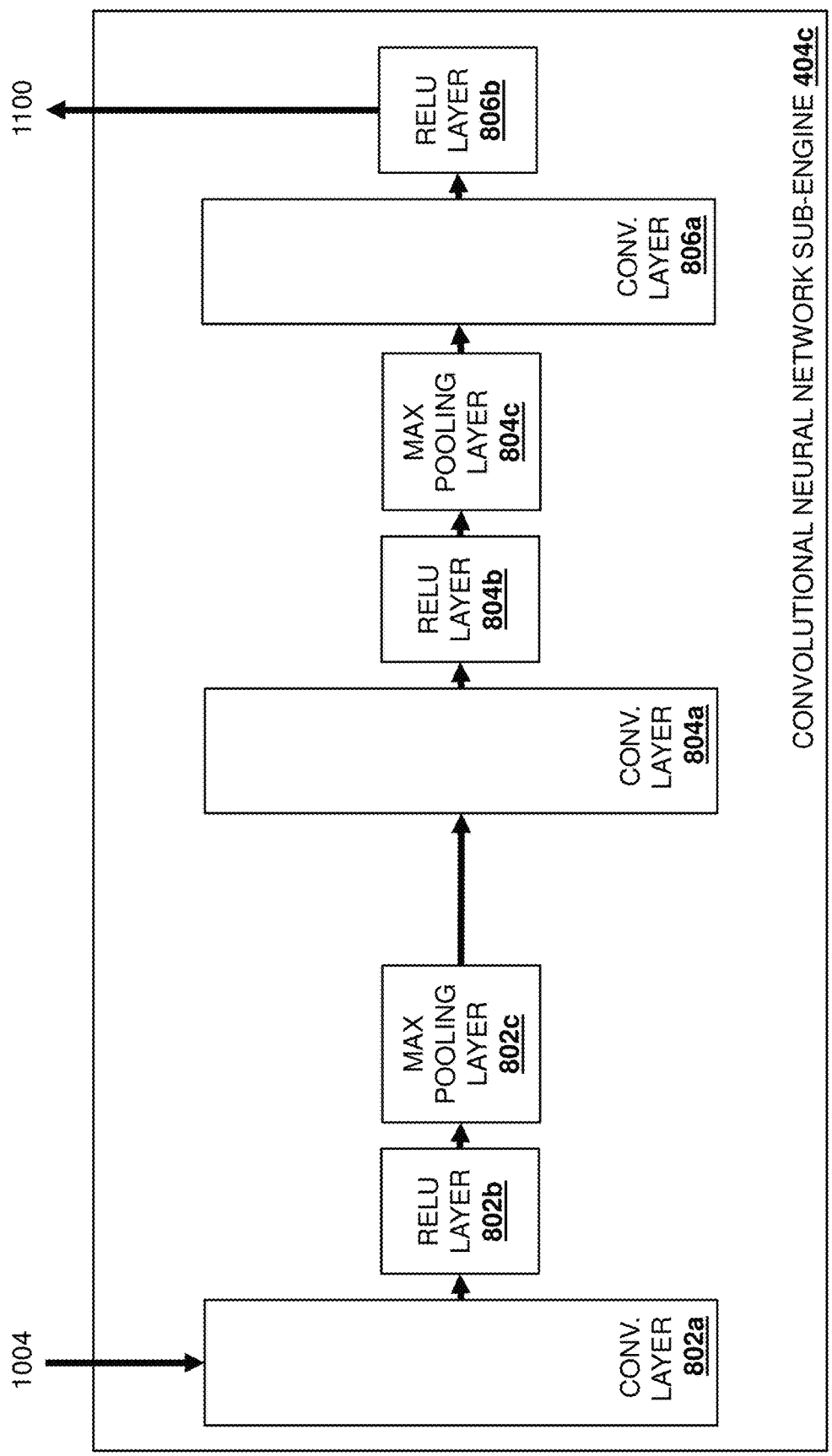
FIG. 11 is a schematic view illustrating an embodiment of a convolutional neural network sub-engine in the board damage classification system of FIG. 4 operating during the method of FIG. 5.
Figure 12:
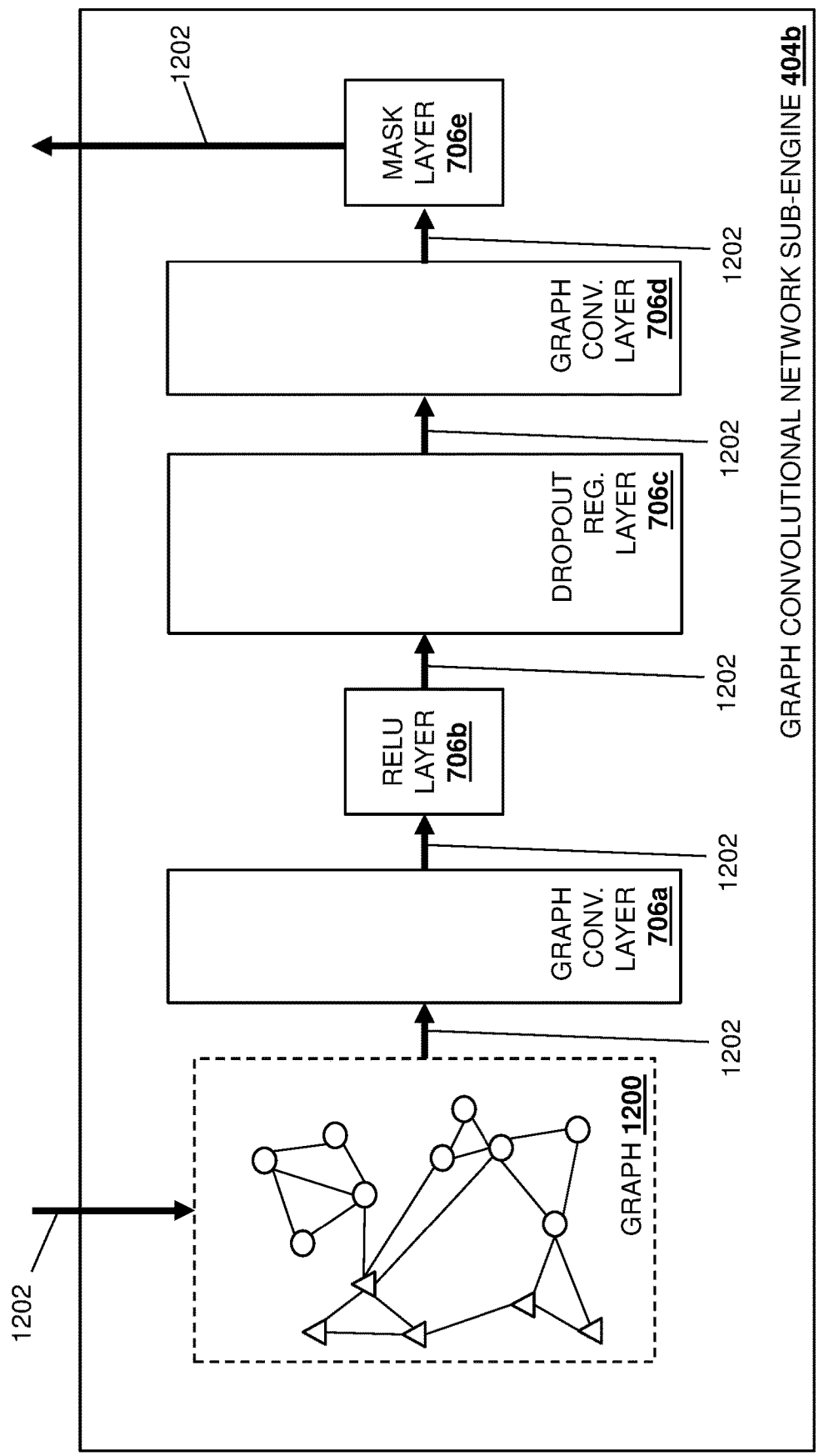
FIG. 12 is a schematic view illustrating an embodiment of a graph convolutional network sub-engine in the board damage classification system of FIG. 4 operating during the method of FIG. 5.

At block 508a in block set 508, the CNN receives the board digital image. With reference to FIG. 11, in an embodiment of block 508a, the CNN sub-engine 404a may receive the board digital image 1004 and may provide that board digital image 1004 to the convolution layer 602a. At block 508b in block set 508, the CNN identifies board features in the board digital image, while at block 508c in block set 508, the CNN determines a board feature damage classification for the board features. In an embodiment, at block 508b, the CNN sub-engine 404a may process the board digital image received at block 508a using the convolutional layer 802a/non-linear activation function (e.g., ReLU) layer 802b/max pooling layer 802c group, and up to the convolutional layer 804a/non-linear activation function (e.g., ReLU) layer 804b/max pooling layer 804c group, as well as using the convolutional layer 806a/non-linear activation function (e.g., ReLU) layer 806b group.

As will be recognized by one of skill in the art in possession of the present disclosure, at least some of that processing by the CNN sub-engine 404c will provide for the analysis of the board digital image 1004 and the resulting identification of board features in the board digital image 1004 (e.g., any or all of the components 306a-306e, the traces 308a-308f, and/or any other identifiable board features that would be apparent to one of skill in the art in possession of the present disclosure), while at least some of that processing by the CNN sub-engine 404c will provide for board feature damage classification for each of the board features identified in the board digital image 1004. As such, and as illustrated in FIG. 11, the non-linear activation function (e.g., ReLU) layer 806b will output board feature damage classification(s) 1100 for each board feature identified in the board digital image 1004. Continuing with the specific example above, the board feature damage classification(s) 1100 output by the GCN sub-engine 404b may include a no damage classification, a minor damage classification, a major damage classification, and a destroyed damage classification for each of the components 306a-306e, the traces 308a-308f, and/or any other board features identified at block 508b.

At block 510a in block set 510, the GCN receives a board feature graph generated using the board digital image. In an embodiment, in response to receiving the board digital image 1004, the graph generation sub-engine 404c may generate a board feature graph 1200 using the board digital image 1004 substantially as described above to provide a graphical representation of the board digital image that designates each component as a node and the connections between them as edges, and may provide that board feature graph 1200 to the GCN sub-engine 404a at block 510a. At block 510b in block set 510, the GCN defines one or more relationships between nodes in the board feature graph. In an embodiment, at block 510b, the GCN sub-engine 404b may process the board feature graph 1200 using the graph convolutional layer 706a, the non-linear activation function (e.g., ReLU) layer 706b, the dropout regularization layer 706c, the graph convolutional layer 706d, and the mask layer 706e. As will be recognized by one of skill in the art in possession of the present disclosure, that processing will operate to define relationship(s) 1202 between nodes in the board feature graph 1200 that are output by the mask layer 706e. Continuing with the specific example above, the relationship(s) 1202 output by the mask layer 706e may define the probability of any node/board feature included in the board feature graph 1200 being damaged when one of its nearest neighbors is damaged.

Figure 13A:
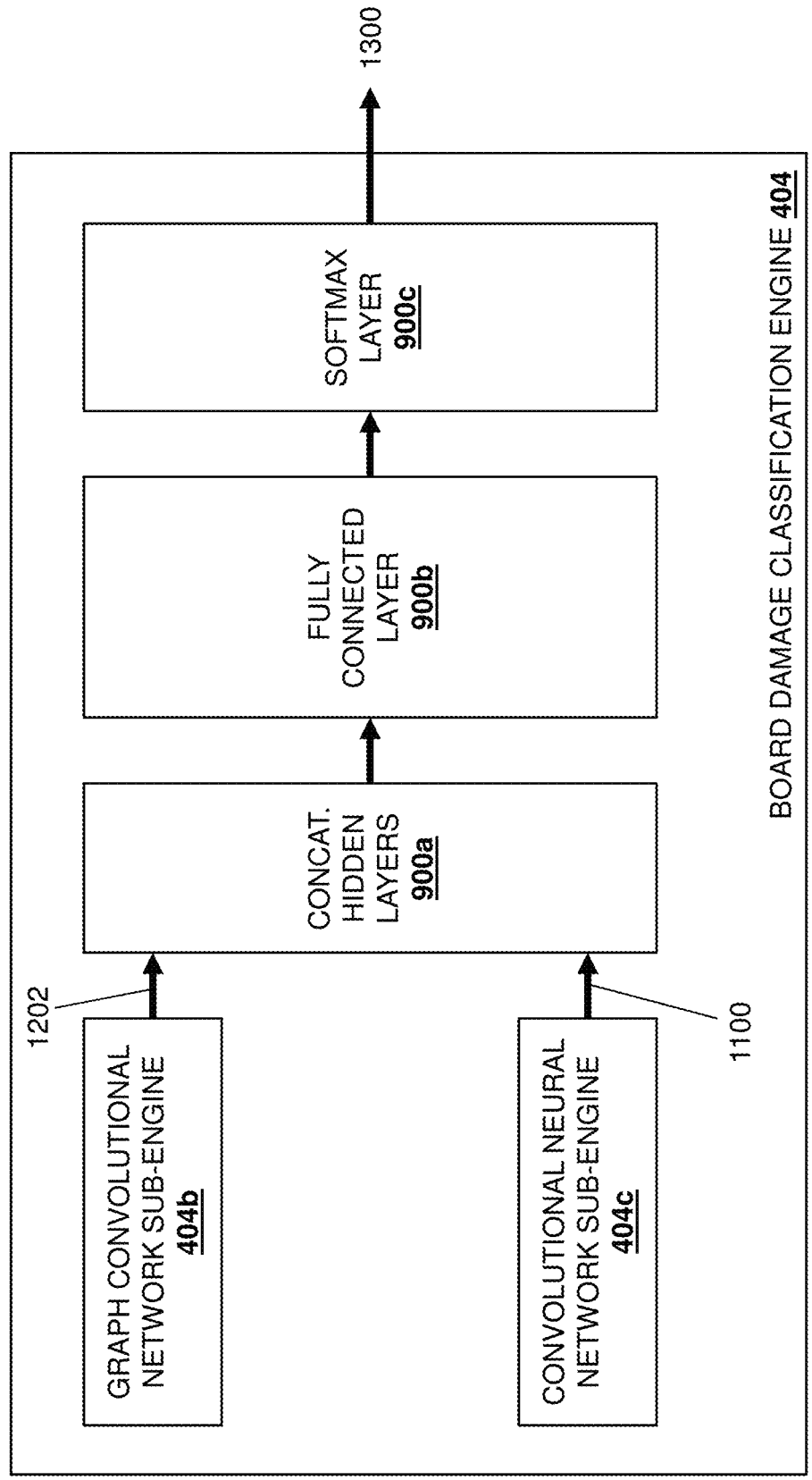
FIG. 13A is a schematic view illustrating an embodiment of a board damage classification engine in the board damage classification system of FIG. 4 operating during the method of FIG. 5.

Following the block sets 508 and 510, the method 500 proceeds to block 512 where the board damage classification system uses the damage classification determined by the CNN and the relationships defined by the GCN to generate a board damage classification. With reference to FIG. 13A, in an embodiment of block 512, the board damage classification engine 404 may process the board feature damage classification(s) 1100 determined by the CNN sub-engine 404c and the relationships defined by the GCN sub-engine 404b using the concatenated hidden layers 900a, the fully connected layer 900b, and the softmax layer 900c to output a board damage classification 1300 that may include a damage probability for any of the board features that were identified in the board digital image 1004. As will be appreciated by one of skill in the art in possession of the present disclosure, the processing discussed above may utilize the relationship(s) 1202 that define the probability of any node/board feature included in the board feature graph 1200 being damaged when one of its nearest neighbors is damaged to determine a probability of any of the board feature damage classification(s) 1100.

Figure 13B:
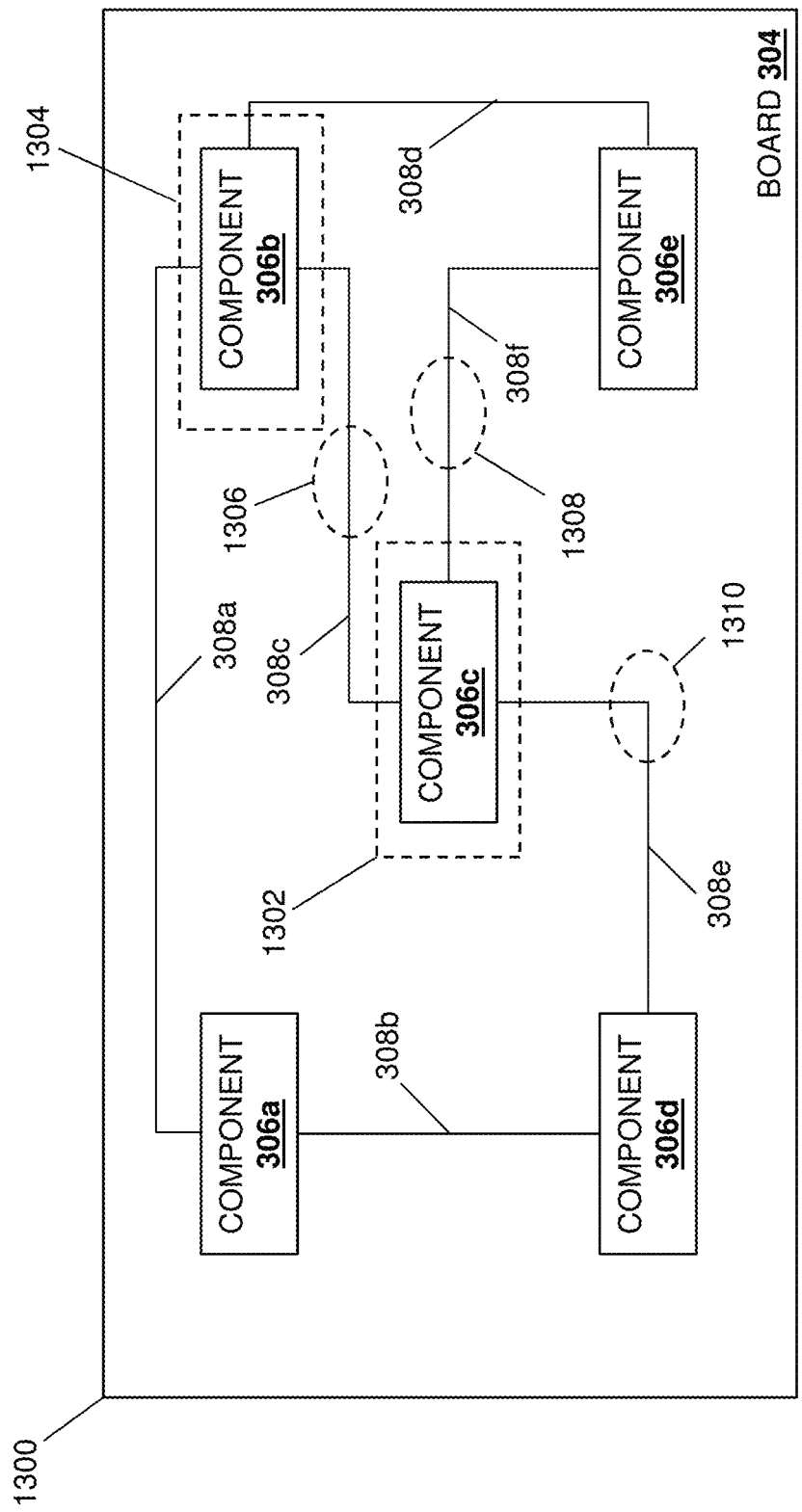
FIG. 13B is an embodiment of a board damage classification providing an annotated digital image of a board in the computing device of FIGS. 3A and 3B that has had its damage classified during the method of FIG. 5.

With reference to FIG. 13B, an example of the board damage classification 1300 is illustrated that may include the board digital image 1004 that has been annotated for board features that have been identified with probable damage. In the illustrated example, the board damage classification 1300 may include a damage indicator element 1302 that corresponds to the component 306c identified in the board digital image 1004 with probable damage, a damage indicator element 1304 that corresponds to the component 306b identified in the board digital image 1004 with probable damage, a damage indicator element 1306 that corresponds to a portion of the trace 308c identified in the board digital image 1004 with probable damage, a damage indicator element 1308 that corresponds to a portion of the trace 308f identified in the board digital image 1004 with probable damage, and a damage indicator element 1310 that corresponds to a portion of the trace 308e identified in the board digital image 1004 with probable damage.

As will be appreciated by one of skill in the art in possession of the present disclosure, any of the damage indicator elements 1302-1310 may be color coded or otherwise provided in a manner that indicates the most probable damage classification for their corresponding board element/component/trace. For example, any of the damage indicator elements 1302-1310 may be colored red to identify a destroyed damage classification as the most probable damage classification for their corresponding component, blue to identify a major damage classification as the most probable damage classification for their corresponding component, and yellow to identify a minor damage classification as the most probable damage classification for their corresponding component. However, while a specific graphical board damage classification 1300 is illustrated and described, one of skill in the art in possession of the present disclosure will appreciate how the board damage classification may be provided in textual (or other) forms while remaining within the scope of the present disclosure as well.

Figure 14A:
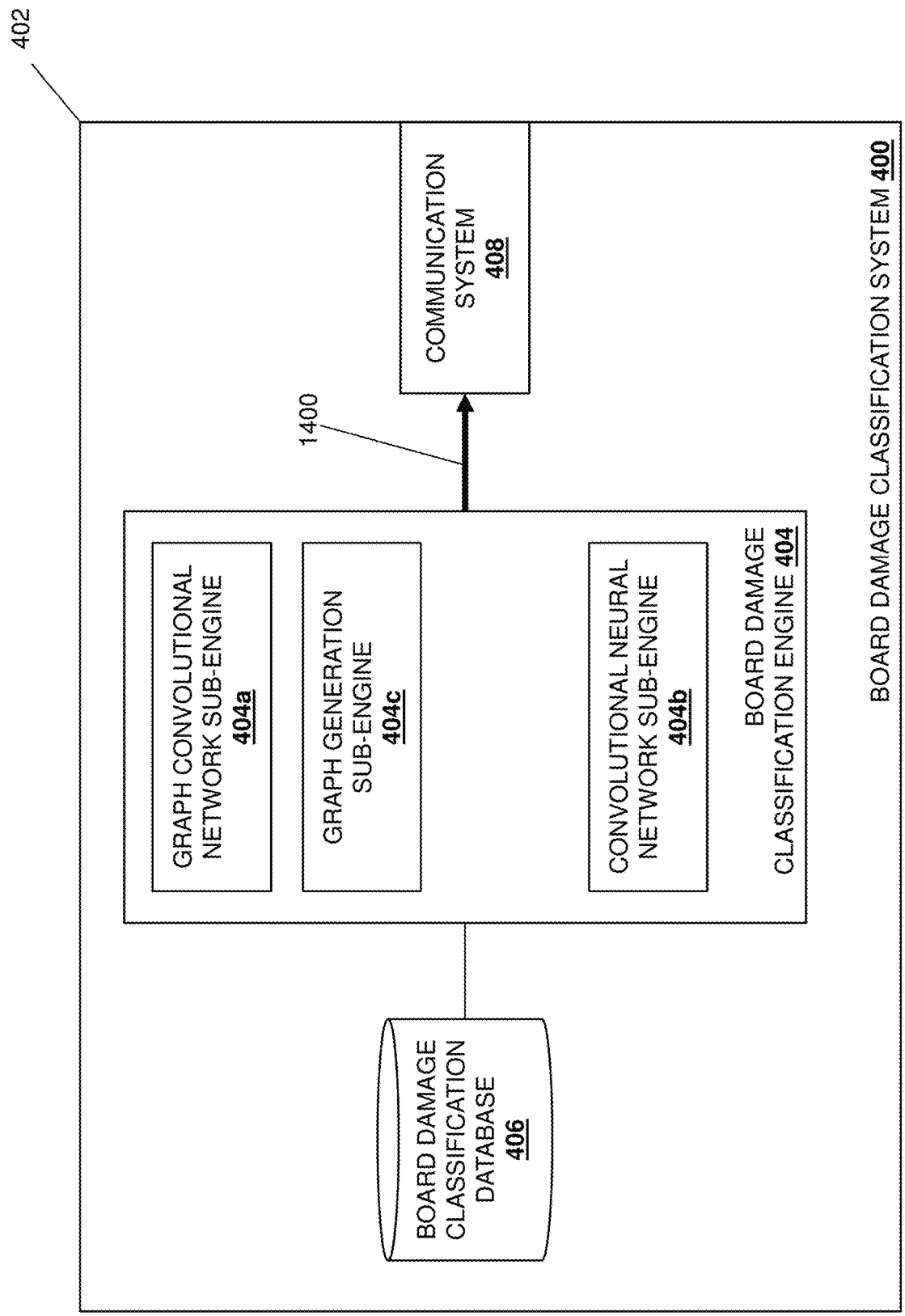
FIG. 14A is a schematic view illustrating an embodiment of the board damage classification system of FIG. 4 operating during the method of FIG. 5.
Figure 14B:
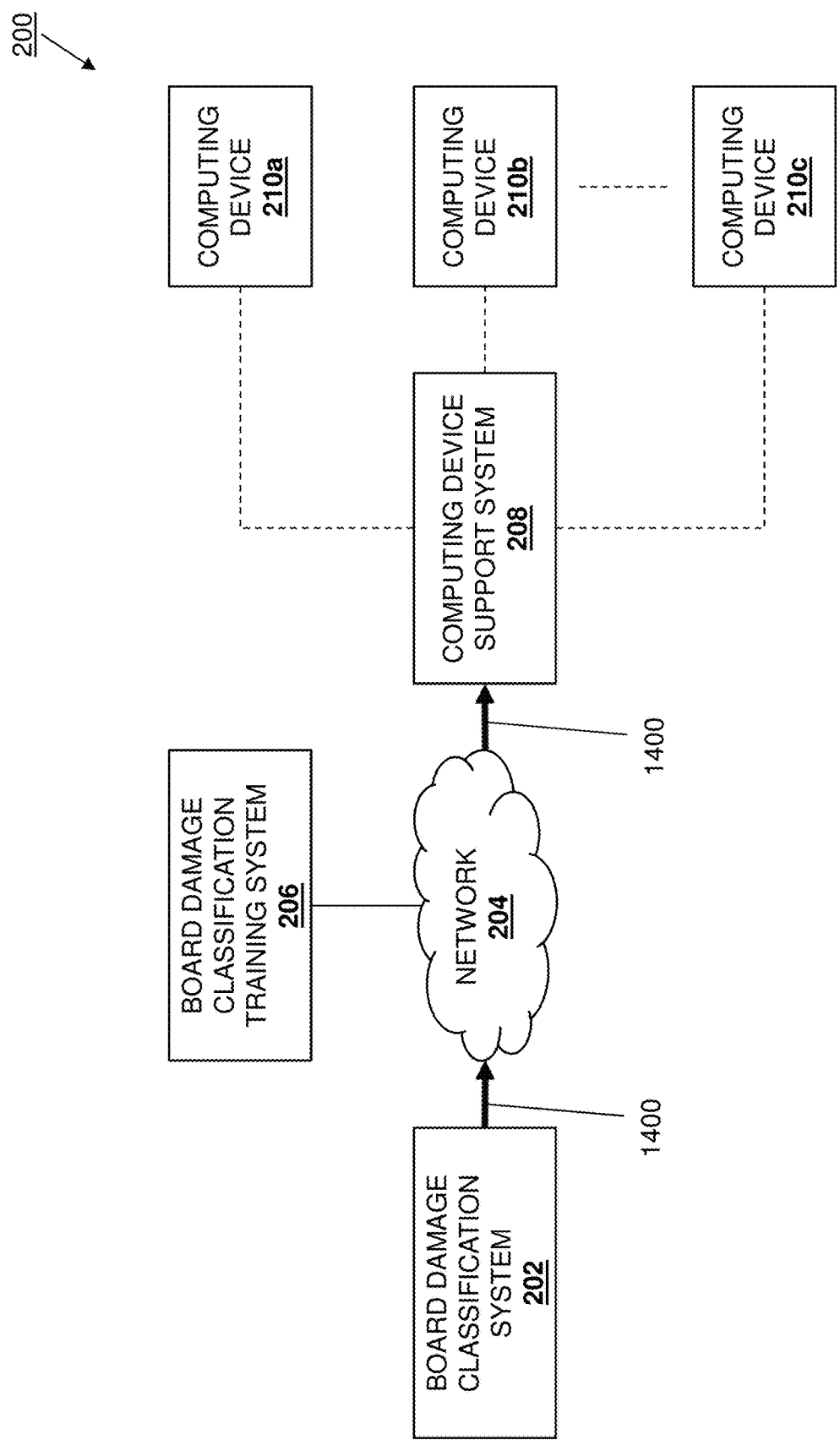
FIG. 14B is a schematic view illustrating an embodiment of the networked system of FIG. 2 operating during the method of FIG. 5.

The method 500 then proceeds to block 514 where the board damage classification system provides the board damage classification for display. As illustrated in FIGS. 14A and 14B, in an embodiment of block 514, the board damage classification engine 404 may perform board damage classification transmission operations 1400 to transmit the board damage classification 1300 via its communication system 408 and through the network 204 to the computing device support system 208. In some embodiments, the computing device support system 208 may then display the board damage classification 1300 on a display device (not illustrated, but which may include the display 110 discussed above with reference to FIG. 1). As such, in embodiments in which the computing device 210a was provided to the computing device support system 208 to diagnose issues, the computing device support system 208 may display the board damage classification 1300 so that a support technician can identify any damage to the board in the computing device 210a that is causing those issues. However, in embodiments in which the computing device 210a transmitted the board digital image to the computing device support system 208 to diagnose issues with another computing device, the computing device support system 208 may transit the board damage classification 1300 for display on the computing device 210a so that user of the computing device 210a can identify any damage to the board in the computing device that is causing its issues.

Thus, systems and methods have been described that provide a hybrid Graph Convolutional Network (GCN)/ Convolutional Neural Network (CNN) deep learning system that may be trained to classify damage to a circuit board based on digital images of structures that have experienced natural disasters, thus eliminating the need to collect millions of images of circuit board with various damage profiles. As will be appreciated by one of skill in the art in possession of the present disclosure, the hybrid GCN/CNN deep learning system does not utilize a relatively large number of hidden layers, reducing training time and the occurrence of relatively high variance/over-fitting. The GCN/CNN deep learning system then uses that training to analyze circuit board digital images of circuit boards that are experiencing issues in order to output 1) a board feature damage classification for board features identified in the board digital image, and 2) relationships between the plurality of nodes included in a board feature graph generated from that board digital image, with the board feature damage classification and relationships then utilized to generate a board damage classification that includes a damage probability for the board features in the board digital image. In experimental embodiments, the utilization of spatial features of board digital images (by the GCN) along with pixel data (by the CNN) from board digital images to perform board damage classification by the hybrid GCN/CNN deep learning system resulted in relatively high levels of success with regard to object damage classification tasks, with the hybrid GCN/CNN damage classifications providing superior results relative to conventional CNN techniques through the use of latent semantic node features in conjunction with the CNN techniques in order to reduce the use of processing resources and time needed to provide similar functionality using a conventional CNN-based system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A board damage classification system, comprising:
a processing system; and
a memory system that is coupled to the processing system and that includes instructions that, when executed by the processing system, cause the processing system to provide a board damage classification engine that includes:
   a Convolutional Neural Network (CNN) sub-engine that was trained to identify board damage using training digital images of structures that have experienced natural disasters, wherein the CNN sub-engine is configured to:
      receive a board digital image of a board;
      analyze the board digital image to identify board features; and
      determine a board feature damage classification for at least one of the board features identified in the board digital image; and
   a Graph Convolutional Network (GCN) sub-engine that was trained to identify board feature damage relationships using training graphs generated from the training digital images of structures that have experienced natural disasters, wherein the CGN sub-engine is configured to:
      receive a board feature graph that was generated using the board digital image and that includes a plurality of nodes that correspond to the board features in the board digital image; and
      define at least one relationship between the plurality of nodes included in the board feature graph,
   wherein the board damage classification engine is configured to:
      utilize the board feature damage classification determined by the CNN sub-engine and the at least one relationship defined by the GCN sub-engine to generate a board damage classification that includes a damage probability for at least one of the board features in the board digital image; and
      provide the board damage classification for display.

2. The system of claim 1, wherein the training digital images of structures that have experienced natural disasters include structure-before-natural-disaster digital images, structure-after-natural-disaster digital images, and structure-masked-labeled digital images.

3. The system of claim 1, wherein the board damage classification engine includes:
a graph generation sub-engine that is configured to:
   receive the digital image of the board;
   generate the board feature graph using the digital image of the board; and
   provide the board feature graph to the GCN sub-engine.

4. The system of claim 1, wherein the board feature damage classification for the at least one of the board features includes one of a not-damaged board feature classification, a minor-damage board feature classification, a major-damage board feature classification, or a destroyed board feature classification.

5. The system of claim 1, wherein the utilization of the board feature damage classification determined by the CNN sub-engine and the at least one relationship defined by the GCN sub-engine to generate the board damage classification includes:
concatenating the board feature damage classification determined by the CNN sub-engine and the at least one relationship defined by the GCN sub-engine into a plurality of hidden layers; and
generating a fully connected layer from the plurality of hidden layers.

6. The system of claim 5, wherein the utilization of the board feature damage classification determined by the CNN sub-engine and the at least one relationship defined by the GCN sub-engine to generate the board damage classification includes:
generating, via a softmax layer, the damage probability for at least one of the board features in the board digital image based on the fully connected layer.

7. An Information Handling System (IHS), comprising:
a processing system; and
a memory system that is coupled to the processing system and that includes instructions that, when executed by the processing system, cause the processing system to provide a board damage classification engine that includes:
   a Convolutional Neural Network (CNN) sub-engine that is configured to:
      receive a board digital image of a board;
      analyze the board digital image to identify board features; and
      determine a board feature damage classification for at least one of the board features identified in the board digital image; and a Graph Convolutional Network (GCN) sub-engine that is configured to:
  receive a board feature graph that was generated using the board digital image and that includes a plurality of nodes that correspond to the board features in the board digital image; and
  define at least one relationship between the plurality of nodes included in the board feature graph,
wherein the board damage classification engine is configured to:
  utilize the board feature damage classification determined by the CNN sub-engine and the at least one relationship defined by the GCN sub-engine to generate a board damage classification that includes a damage probability for at least one of the board features in the board digital image; and
  provide the board damage classification for display.

8. The IHS of claim 7, wherein the CNN sub-engine was trained to identify board damage using training digital images of structures that have experienced natural disasters, and wherein the GCN sub-engine was trained to identify board feature damage relationships using training graphs generated from the training digital images of structures that have experienced natural disasters.

9. The IHS of claim 8, wherein the training digital images of structures that have experienced natural disasters include structure-before-natural-disaster digital images, structure-after-natural-disaster digital images, and structure-masked-labeled digital images.

10. The IHS of claim 7, wherein the board damage classification engine includes:
  a graph generation sub-engine that is configured to:
    receive the digital image of the board;
    generate the board feature graph using the digital image of the board; and
    provide the board feature graph to the GCN sub-engine.

11. The IHS of claim 7, wherein the board feature damage classification for the at least one of the board features includes one of a not-damaged board feature classification, a minor-damage board feature classification, a major-damage board feature classification, or a destroyed board feature classification.

12. The IHS of claim 7, wherein the utilization of the board feature damage classification determined by the CNN sub-engine and the at least one relationship defined by the GCN sub-engine to generate the board damage classification includes:
  concatenating the board feature damage classification determined by the CNN sub-engine and the at least one relationship defined by the GCN sub-engine into a plurality of hidden layers; and
  generating a fully connected layer from the plurality of hidden layers.

13. The IHS of claim 12, wherein the utilization of the board feature damage classification determined by the CNN sub-engine and the at least one relationship defined by the GCN sub-engine to generate the board damage classification includes:
  generating, via a softmax layer, the damage probability for at least one of the board features in the board digital image based on the fully connected layer.

14. A method for classifying damage to a board, comprising:
  receiving, by a Convolutional Neural Network (CNN) sub-engine included in a board damage classification engine, a board digital image of a board;
  analyzing, by the CNN sub-engine, the board digital image to identify board features; and
  determining, by the CNN sub-engine, a board feature damage classification for at least one of the board features identified in the board digital image;
  receiving, by a Graph Convolutional Network (GCN) sub-engine included in the board damage classification engine, a board feature graph that was generated using the board digital image and that includes a plurality of nodes that correspond to the board features in the board digital image;
  defining, by the GCN sub-engine, at least one relationship between the plurality of nodes included in the board feature graph,
  utilizing, by the board damage classification engine, the board feature damage classification determined by the CNN sub-engine and the at least one relationship defined by the GCN sub-engine to generate a board damage classification that includes a damage probability for at least one of the board features in the board digital image; and
  providing, by the board damage classification engine, the board damage classification for display.

15. The method of claim 14, further comprising:
  training, by the CNN sub-engine, to identify board damage using training digital images of structures that have experienced natural disasters; and
  training, by the GCN sub-engine, to identify board feature damage relationships using training graphs generated from the training digital images of structures that have experienced natural disasters.

16. The method of claim 15, wherein the training digital images of structures that have experienced natural disasters include structure-before-natural-disaster digital images, structure-after-natural-disaster digital images, and structure-masked-labeled digital images.

17. The method of claim 14, further comprising:
  receiving, by a graph generation sub-engine included in the board damage classification engine, the digital image of the board;
  generating, by the graph generation sub-engine, the board feature graph using the digital image of the board; and
  providing, by the graph generation sub-engine, the board feature graph to the GCN sub-engine.

18. The method of claim 14, wherein the damage classification for the at least one of the board features includes one of a not-damaged board feature classification, a minor-damage board feature classification, a major-damage board feature classification, or a destroyed board feature classification.

19. The method of claim 14, wherein the utilization of the board feature damage classification determined by the CNN sub-engine and the at least one relationship defined by the GCN sub-engine to generate the board damage classification includes:
  concatenating the board feature damage classification determined by the CNN sub-engine and the at least one relationship defined by the GCN sub-engine into a plurality of hidden layers; and
  generating a fully connected layer from the plurality of hidden layers.

20. The method of claim 14, wherein the utilization of the board feature damage classification determined by the CNN sub-engine and the at least one relationship defined by the GCN sub-engine to generate the board damage classification includes:

generating, via a softmax layer, the damage probability for at least one of the board features in the board digital image based on the fully connected layer.

\* \* \* \* \*